United States Patent
Malik et al.

(10) Patent No.: US 8,091,082 B2
(45) Date of Patent: Jan. 3, 2012

(54) SYSTEMS AND METHODS FOR RISK ANALYSIS AND UPDATING OF SOFTWARE

(75) Inventors: Sandeep K Malik, Fremont, CA (US); Barjinder Singh Anandpuri, Fremont, CA (US); Baljit Gupta, Fremont, CA (US); Krishnamoorthy Ramamoorthy, Fremont, CA (US)

(73) Assignee: DGN Technologies, Inc., Fremont, CA (US)

( * ) Notice: Subject to any disclaimer, the term of this patent is extended or adjusted under 35 U.S.C. 154(b) by 933 days.

(21) Appl. No.: 12/046,624

(22) Filed: Mar. 12, 2008

(65) Prior Publication Data
US 2009/0235232 A1 Sep. 17, 2009

(51) Int. Cl.
*G06F 9/44* (2006.01)
(52) U.S. Cl. .................................................. 717/168
(58) Field of Classification Search .................. 717/120, 717/168, 179
See application file for complete search history.

(56) References Cited

U.S. PATENT DOCUMENTS

| | | | |
|---|---|---|---|
| 2004/0003266 A1* | 1/2004 | Moshir et al. | 713/191 |
| 2004/0123234 A1* | 6/2004 | Anderson et al. | 715/513 |
| 2005/0008163 A1* | 1/2005 | Leser et al. | 380/281 |
| 2005/0097146 A1* | 5/2005 | Konstantinou et al. | 707/200 |
| 2005/0138081 A1* | 6/2005 | Alshab et al. | 707/200 |
| 2006/0025985 A1* | 2/2006 | Vinberg et al. | 703/22 |
| 2006/0156289 A1* | 7/2006 | Spinner | 717/124 |
| 2007/0180075 A1* | 8/2007 | Chasman et al. | 709/223 |
| 2008/0109871 A1* | 5/2008 | Jacobs | 726/1 |
| 2008/0133691 A1* | 6/2008 | Holt | 709/212 |
| 2008/0140976 A1* | 6/2008 | Holt | 711/168 |
| 2011/0066583 A1* | 3/2011 | Willis et al. | 706/48 |

* cited by examiner

*Primary Examiner* — Anna Deng
(74) *Attorney, Agent, or Firm* — Tran & Associates

(57) ABSTRACT

Systems and methods for updating software includes detecting a change for a change object being generated or mitigated across a system landscape; comparing the change to a predetermined guideline; and preventing the change from propagating across the system landscape.

18 Claims, 31 Drawing Sheets

Product Overview

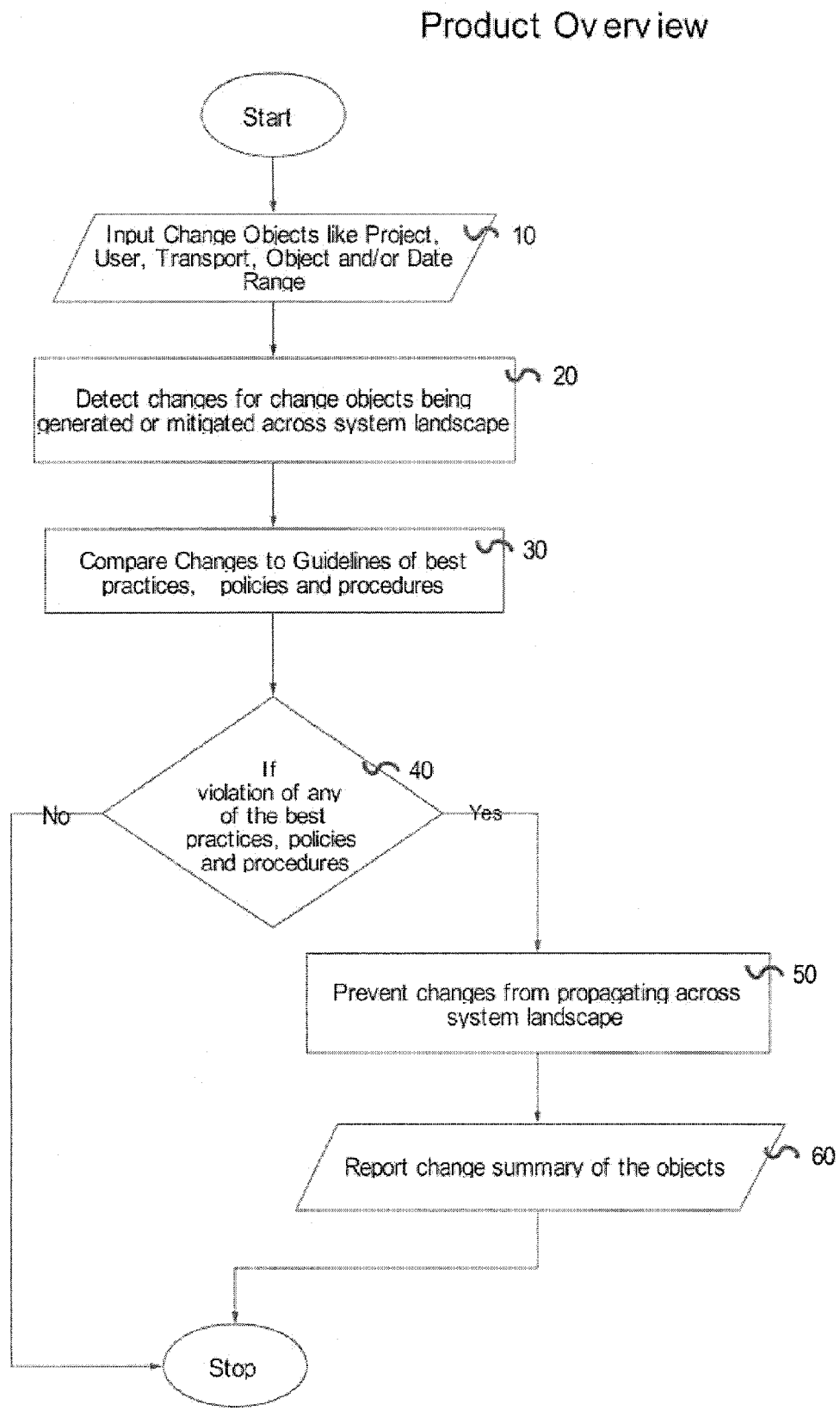
Fig: 1

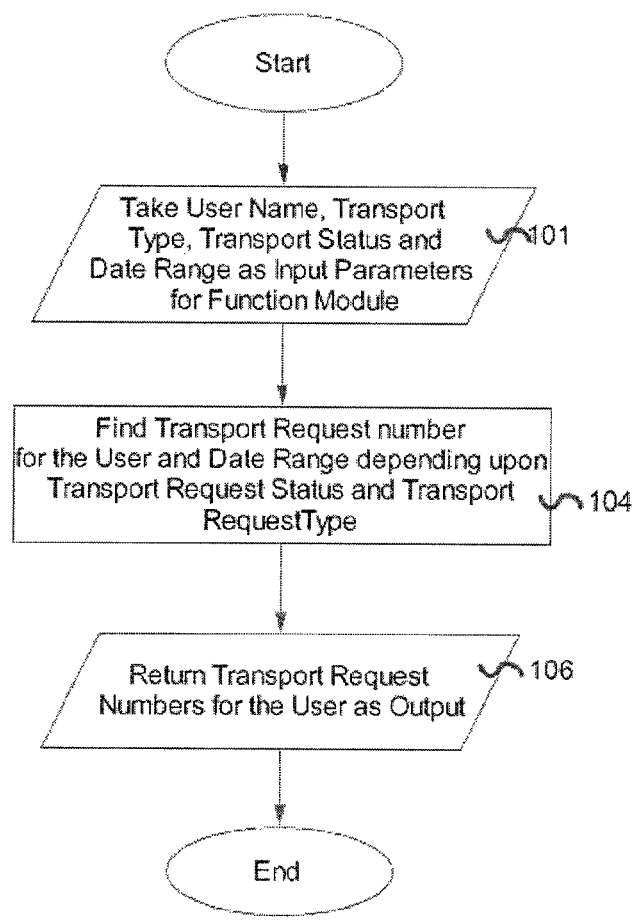
Fig: 2

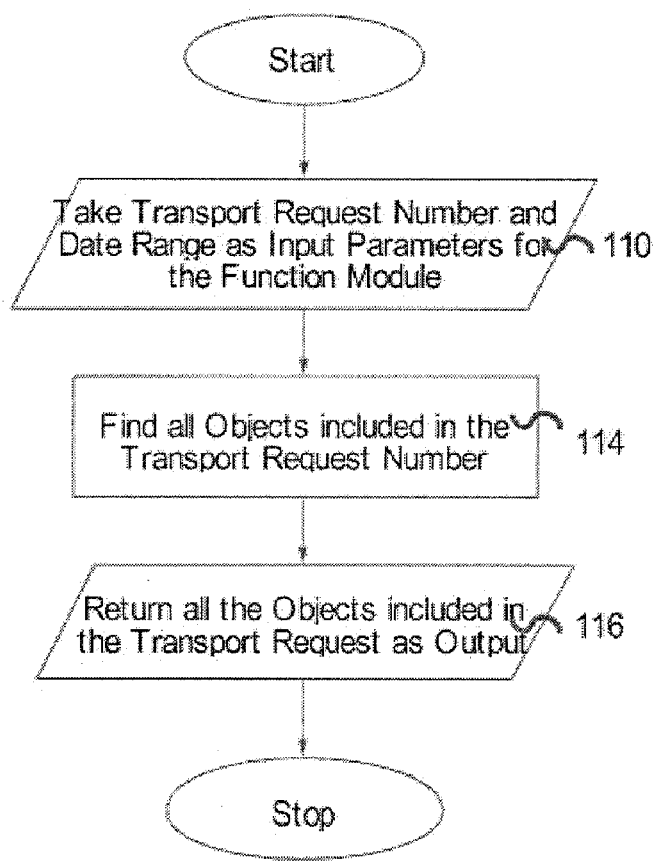
Fig: 3

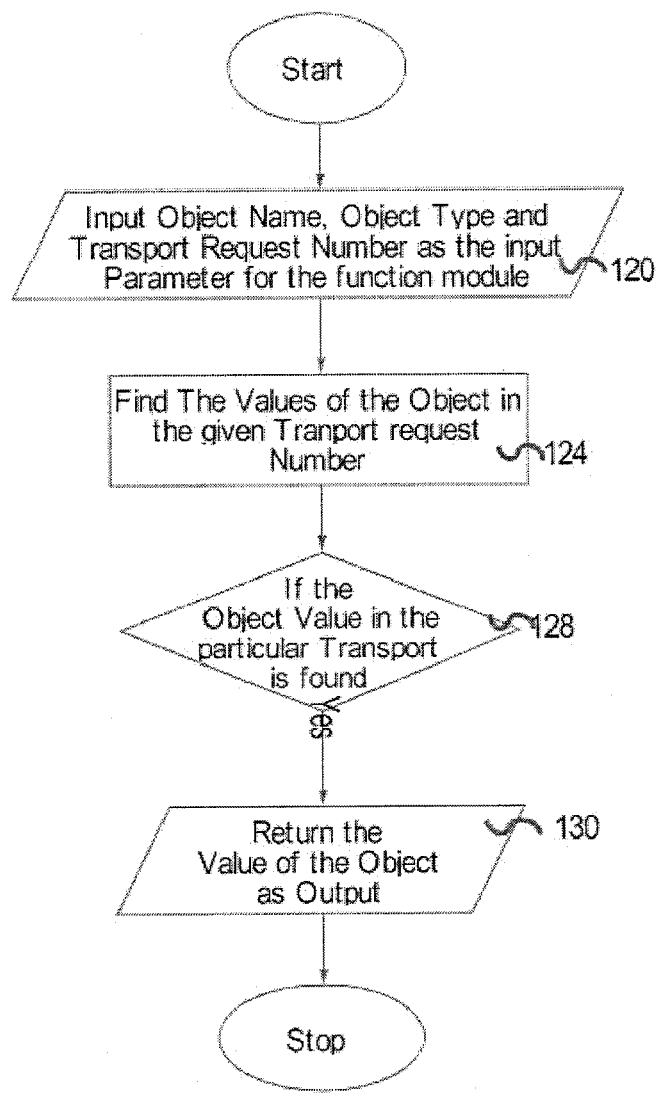
Fig: 4

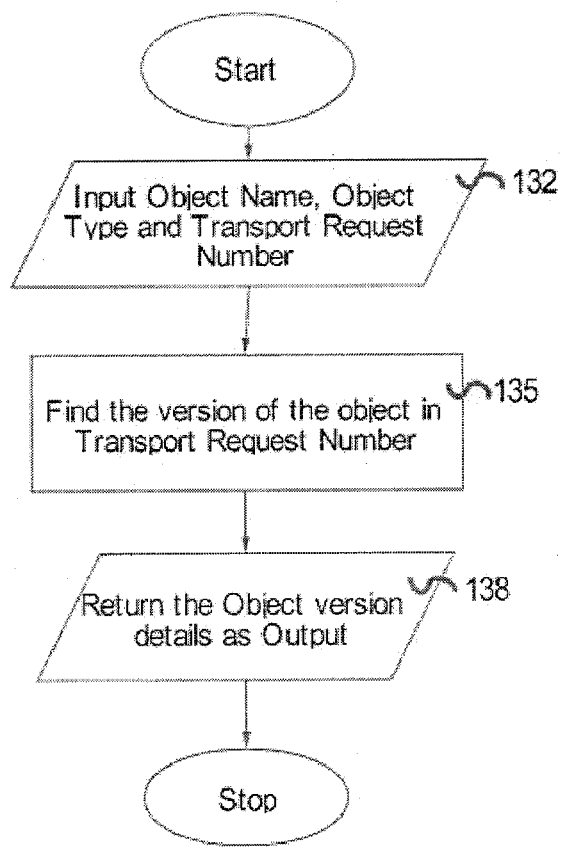
Fig: 5

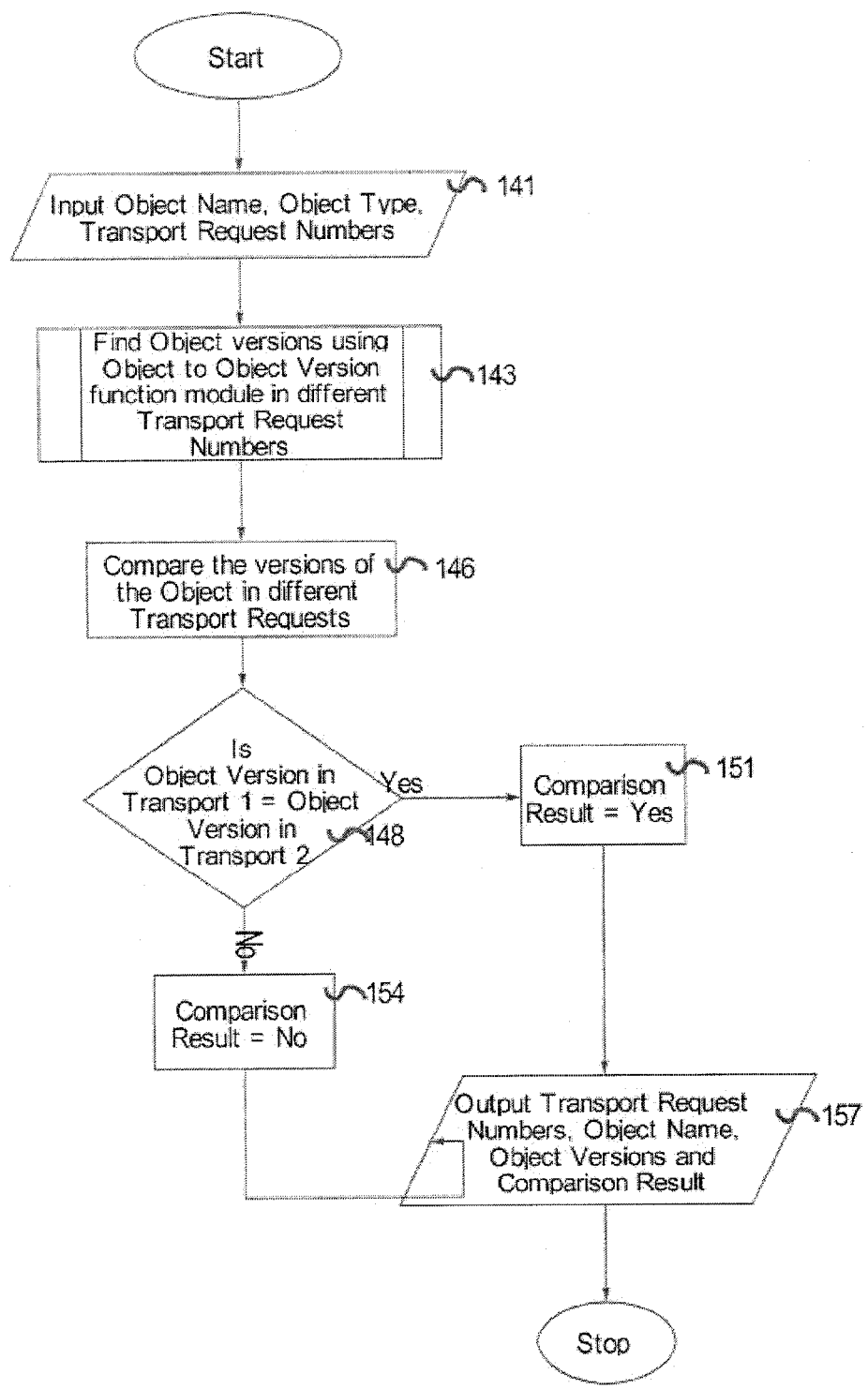
Fig: 6

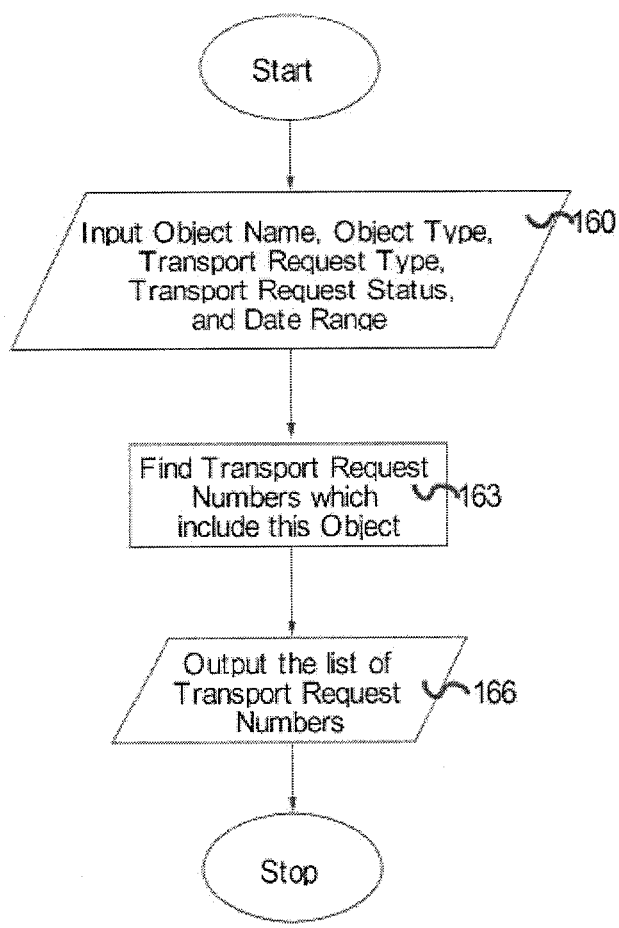
Fig: 7

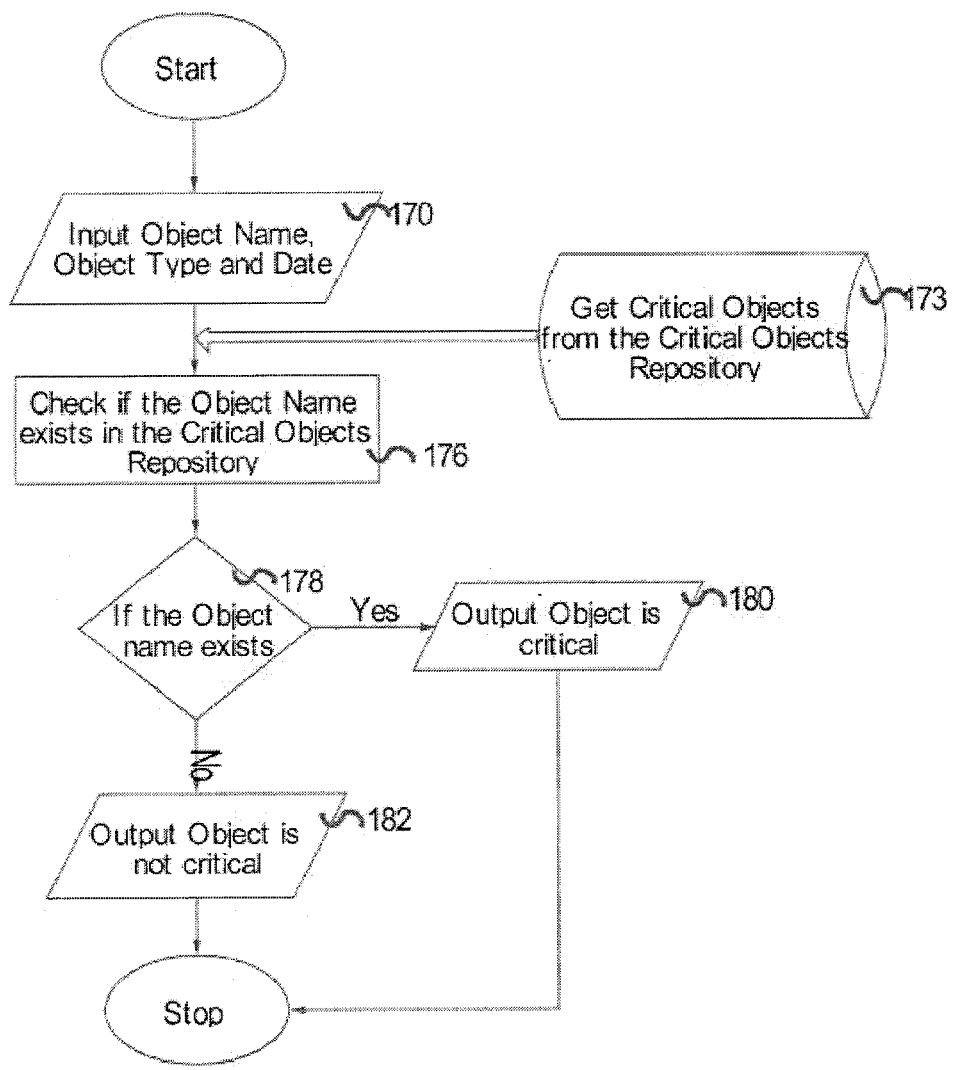
Fig: 8

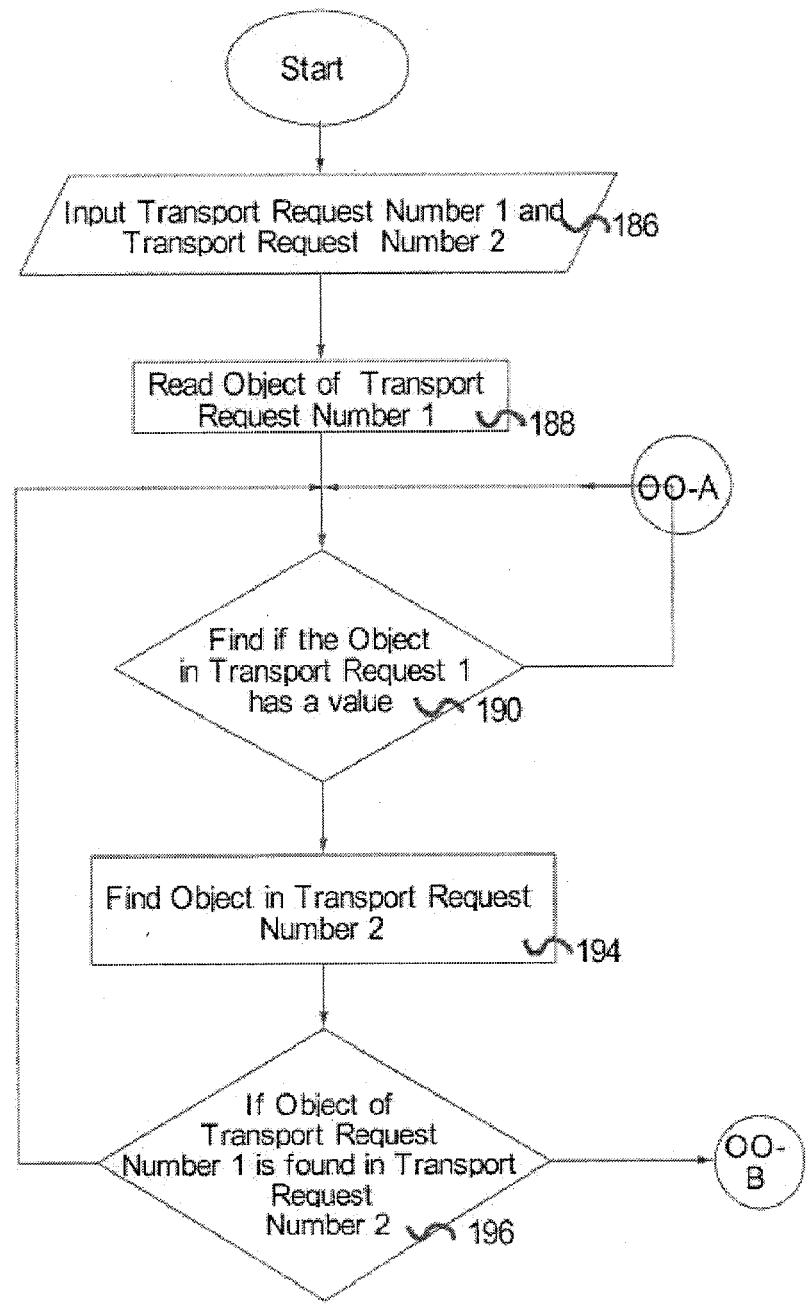
Fig: 9.1

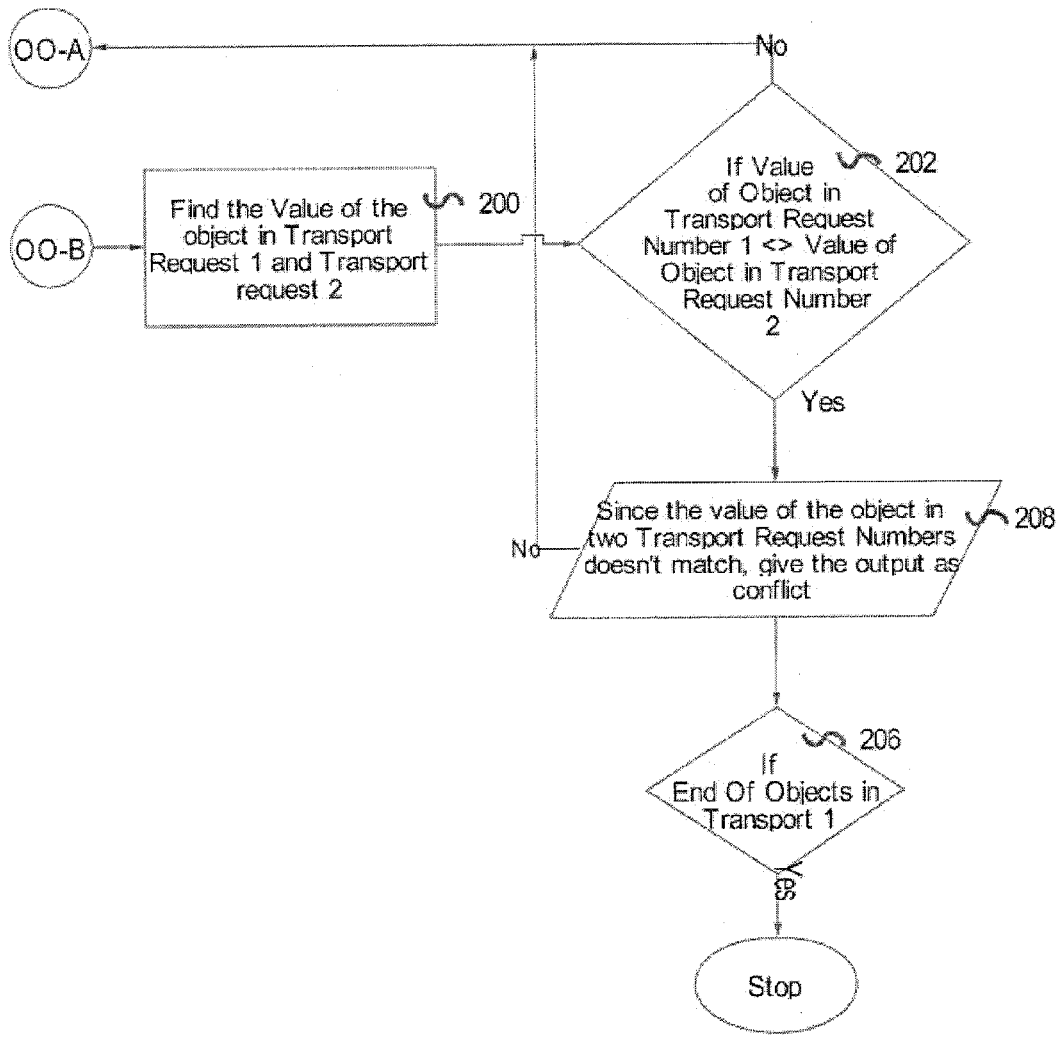
Fig: 9.2

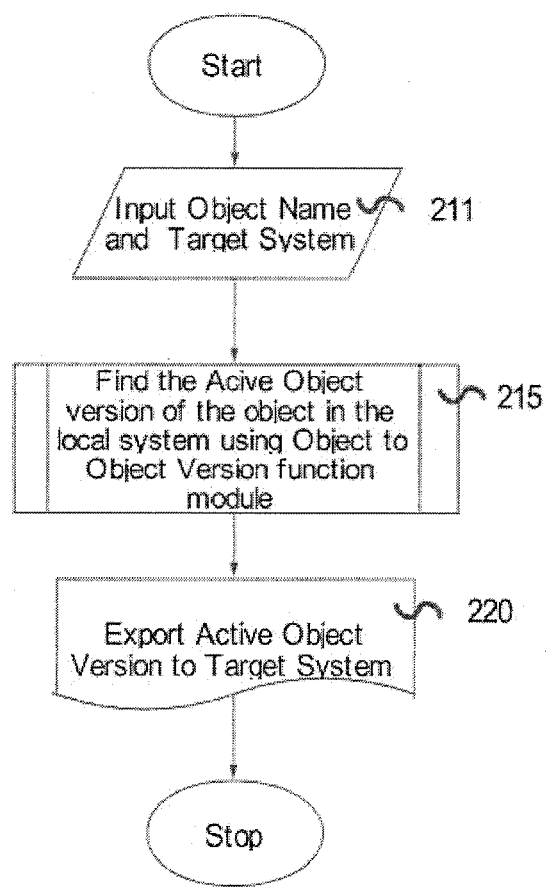
Fig: 10

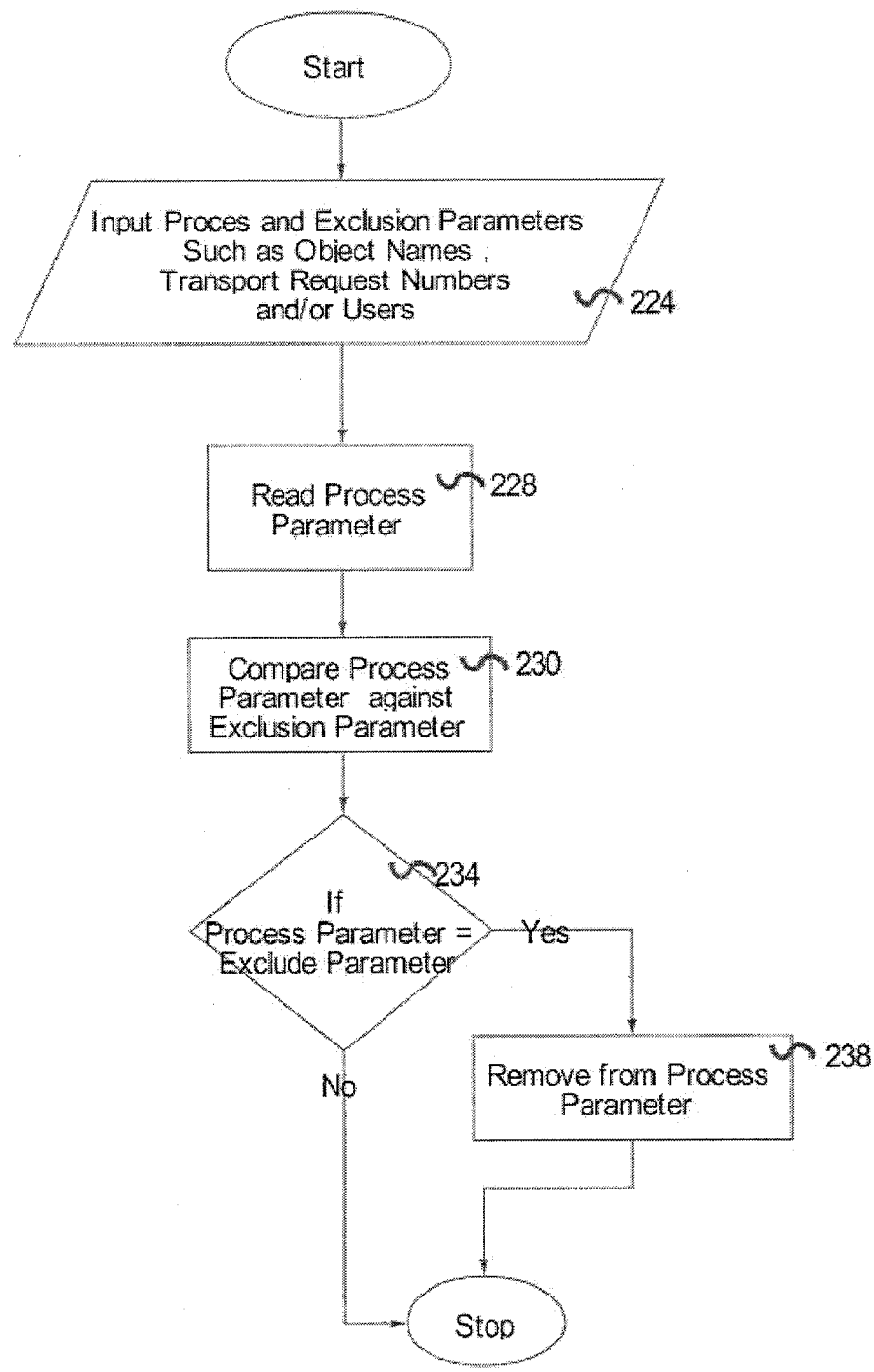
Fig: 11

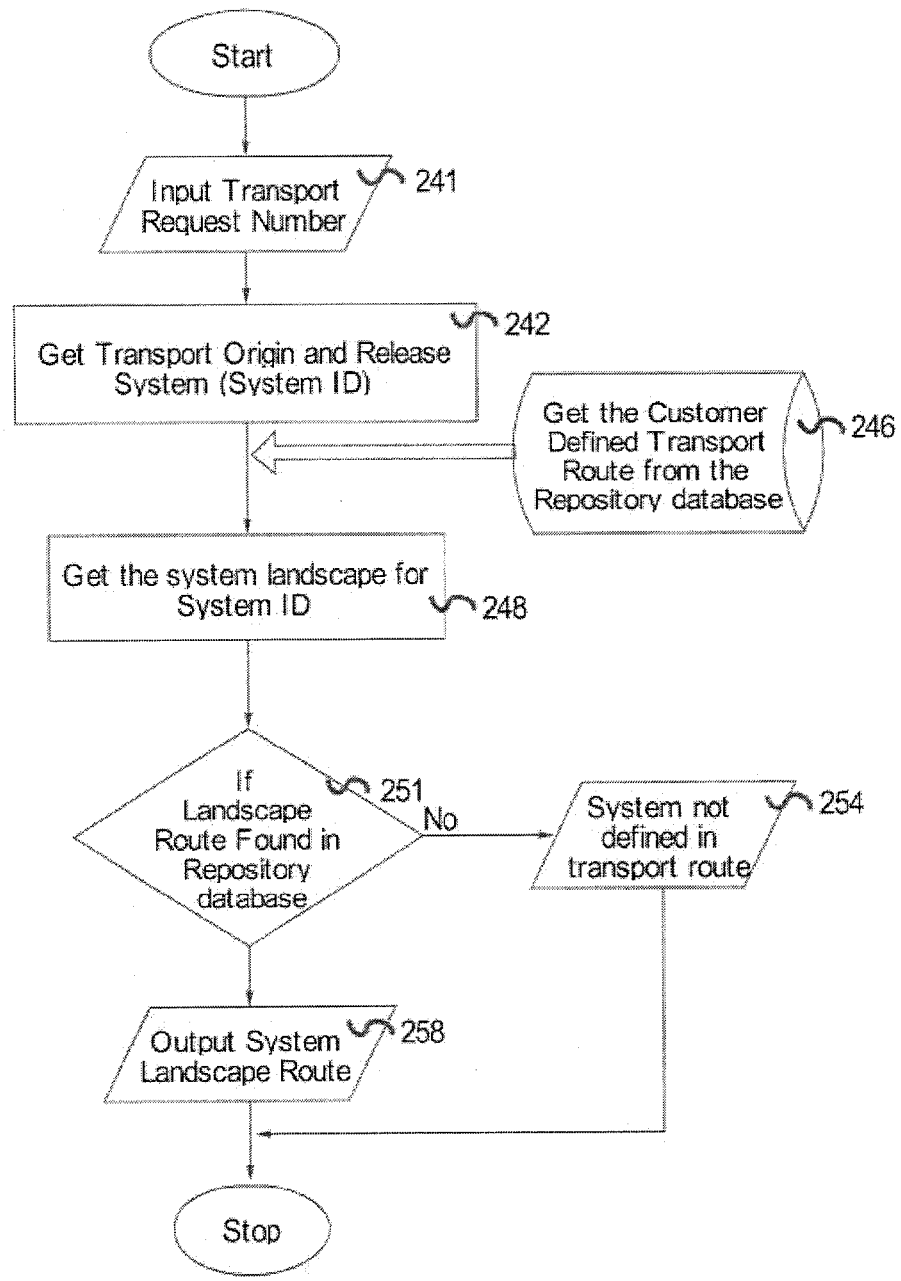
Fig: 12

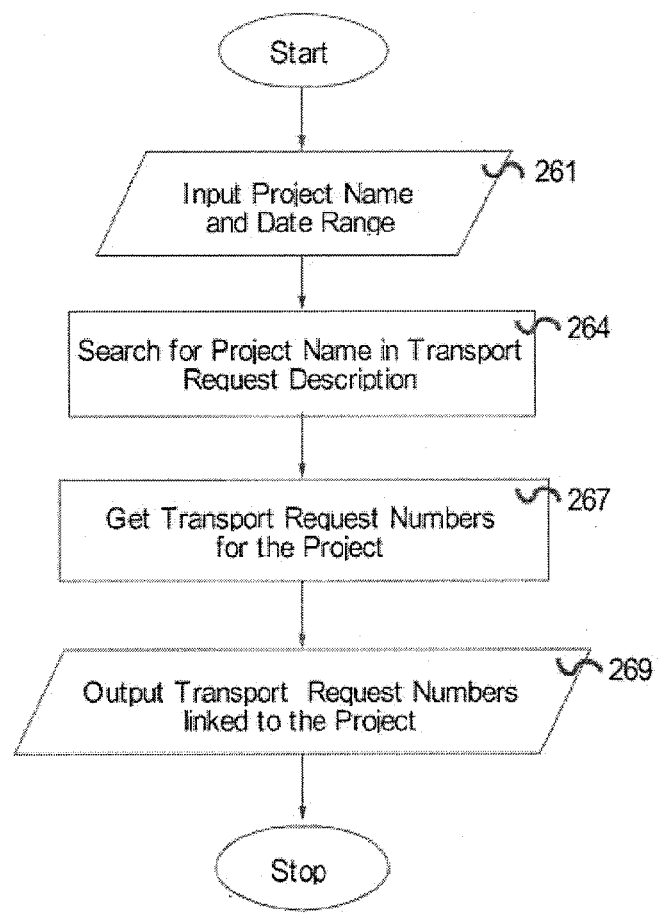
Fig: 13

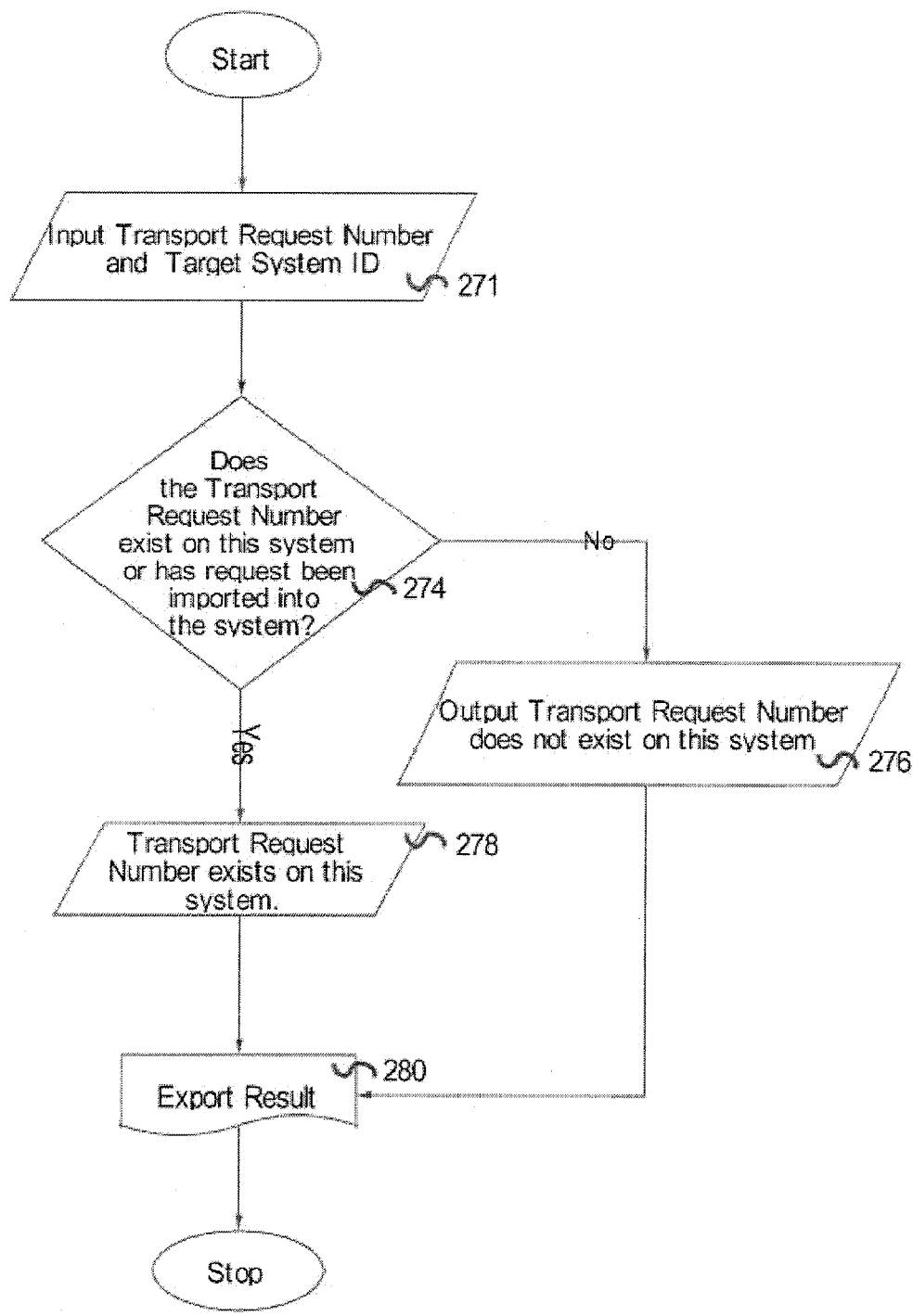
Fig: 14

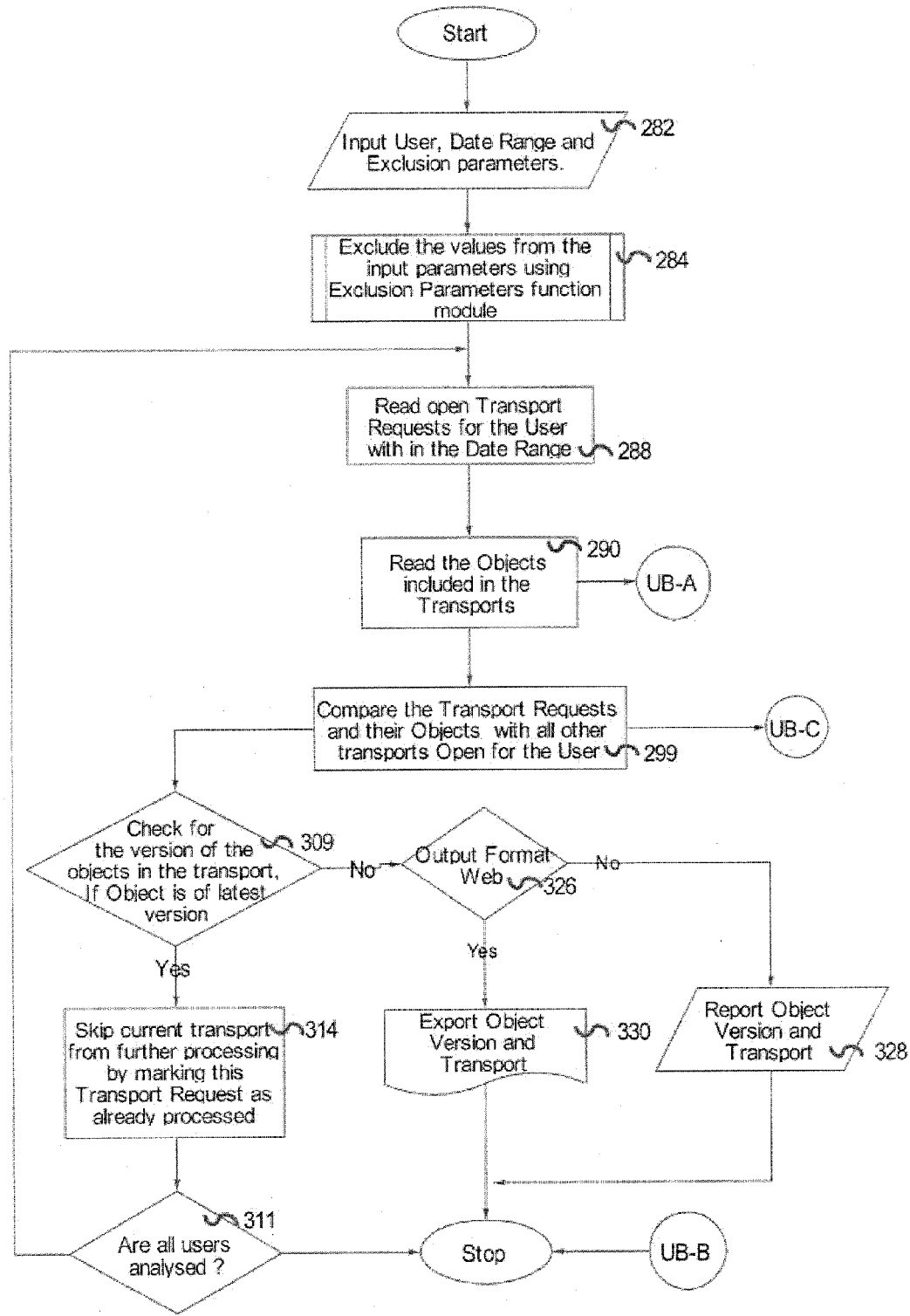
Fig: 15.1

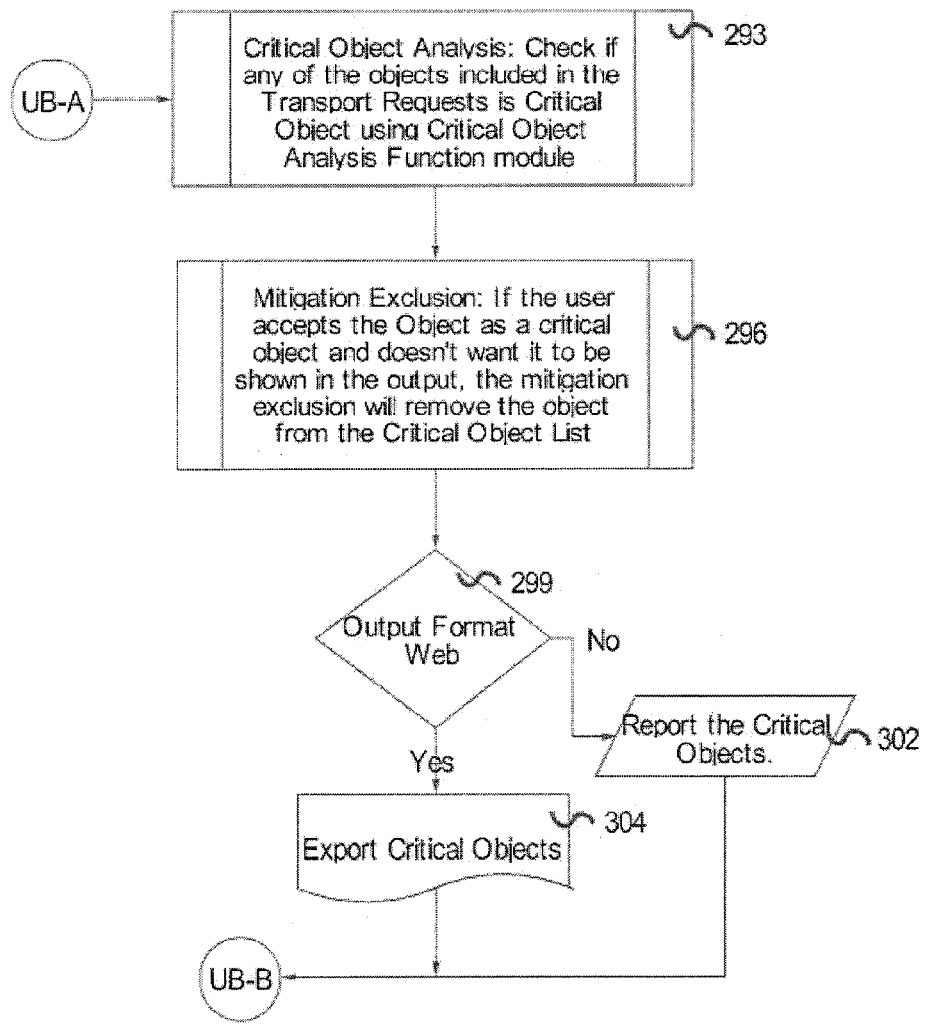
Fig: 15.2

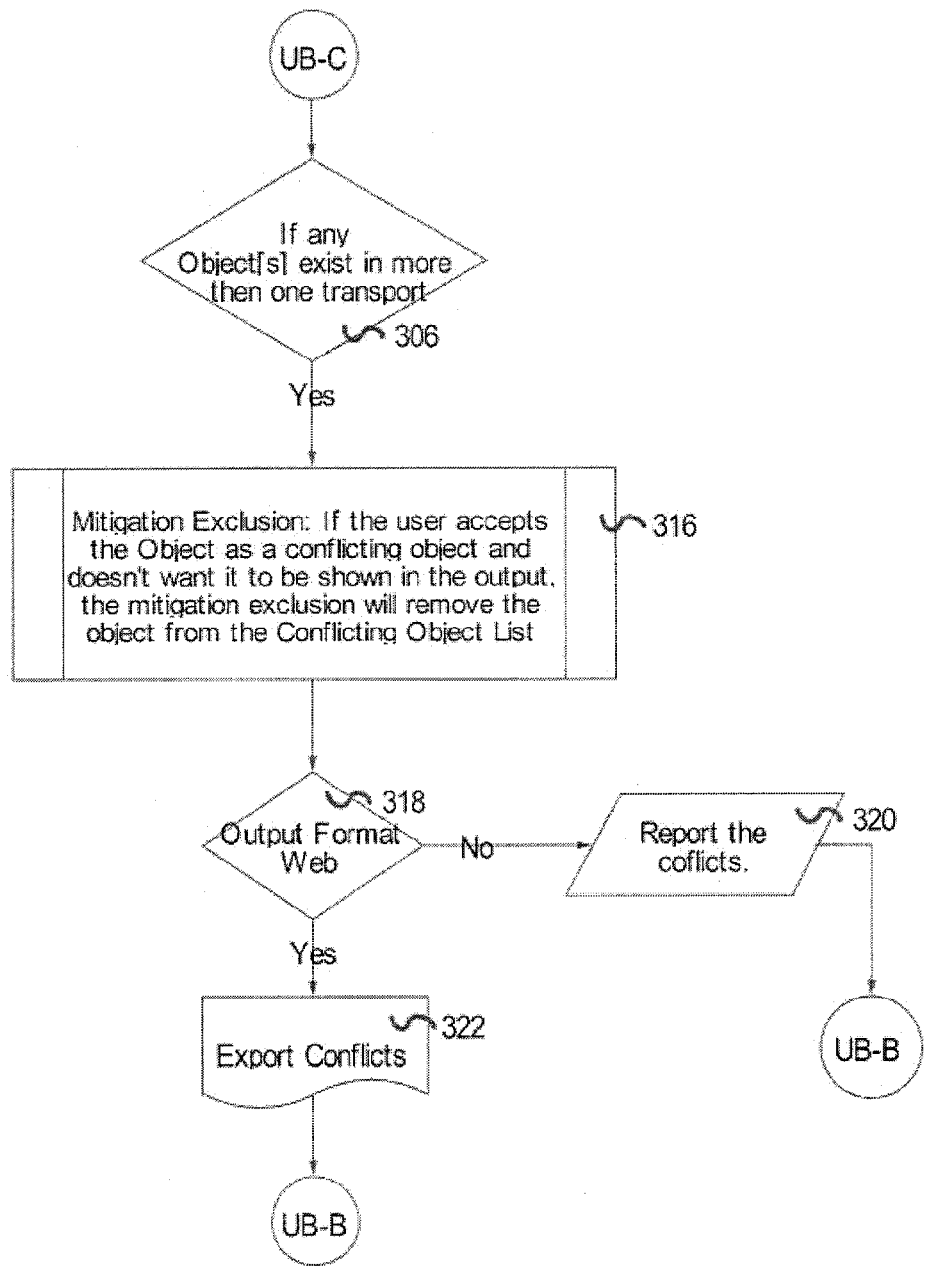
Fig: 15.3

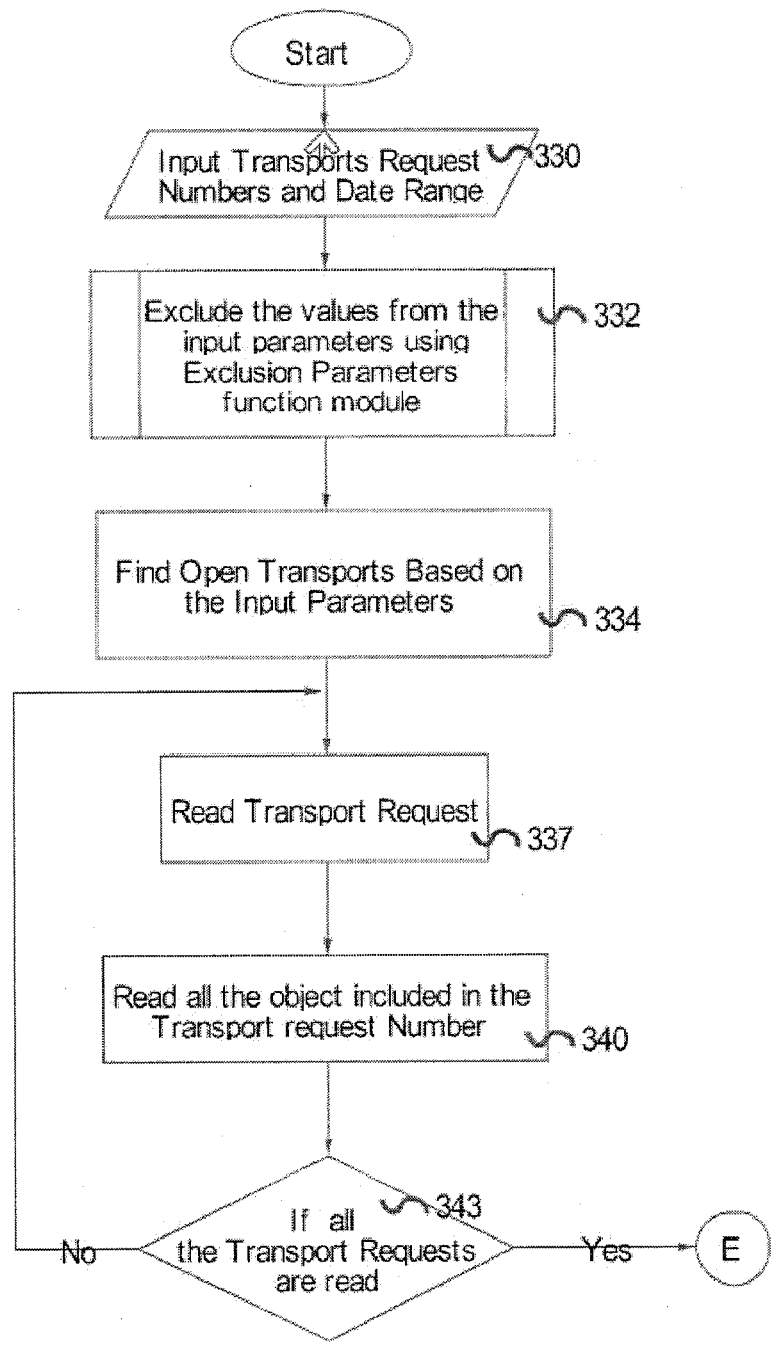
Fig: 16.1

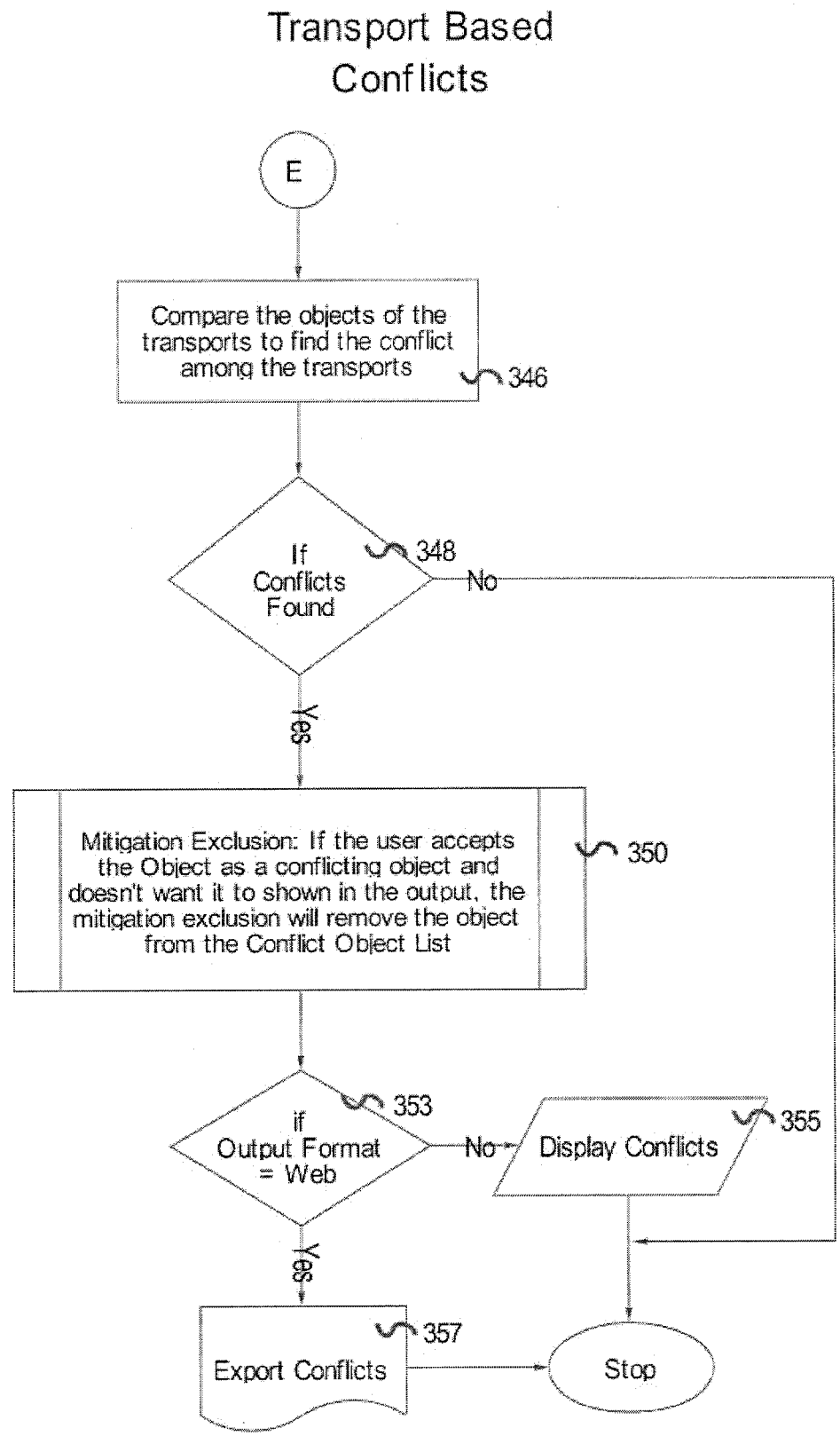
Fig: 16.2

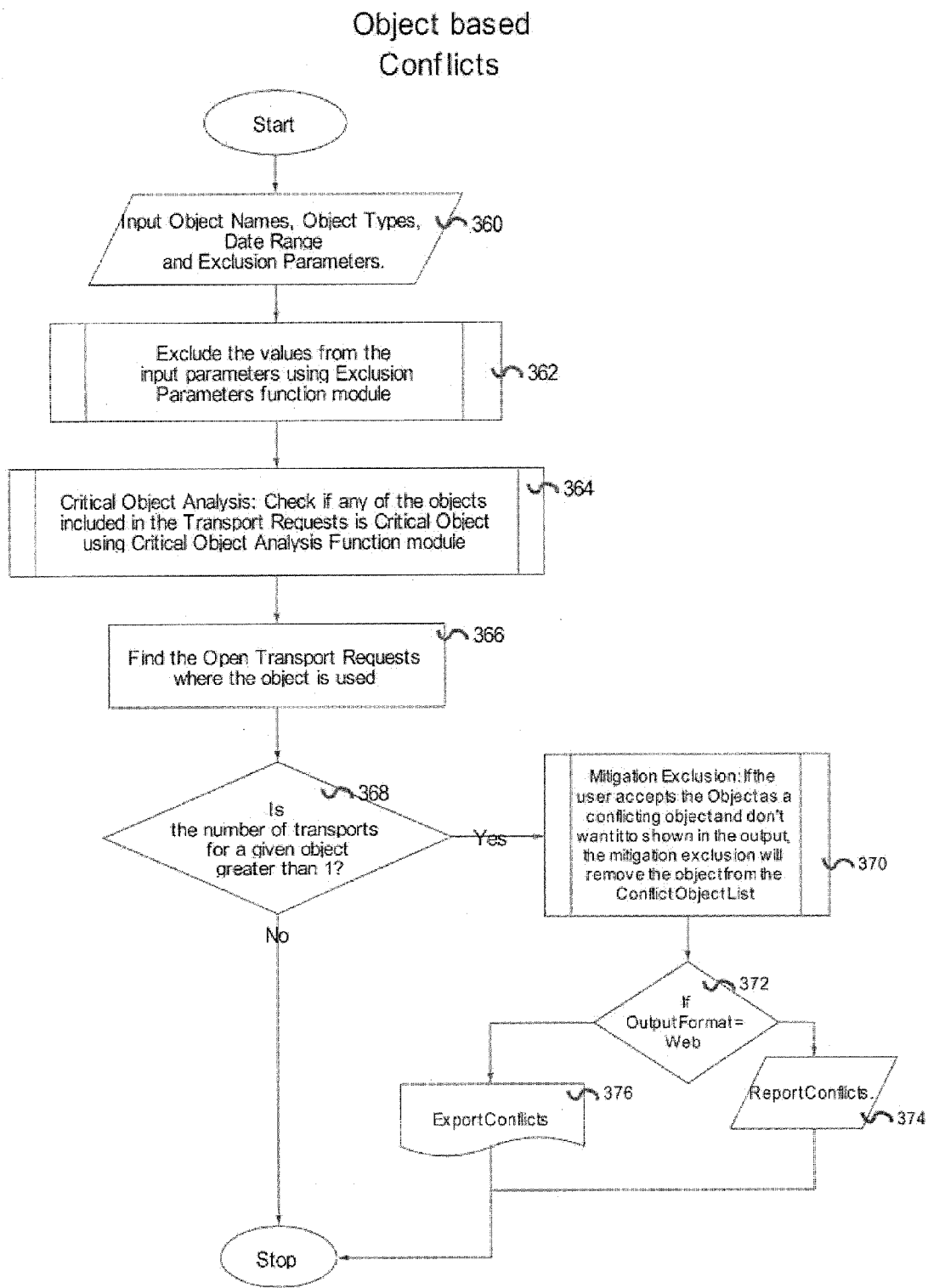
Fig: 17

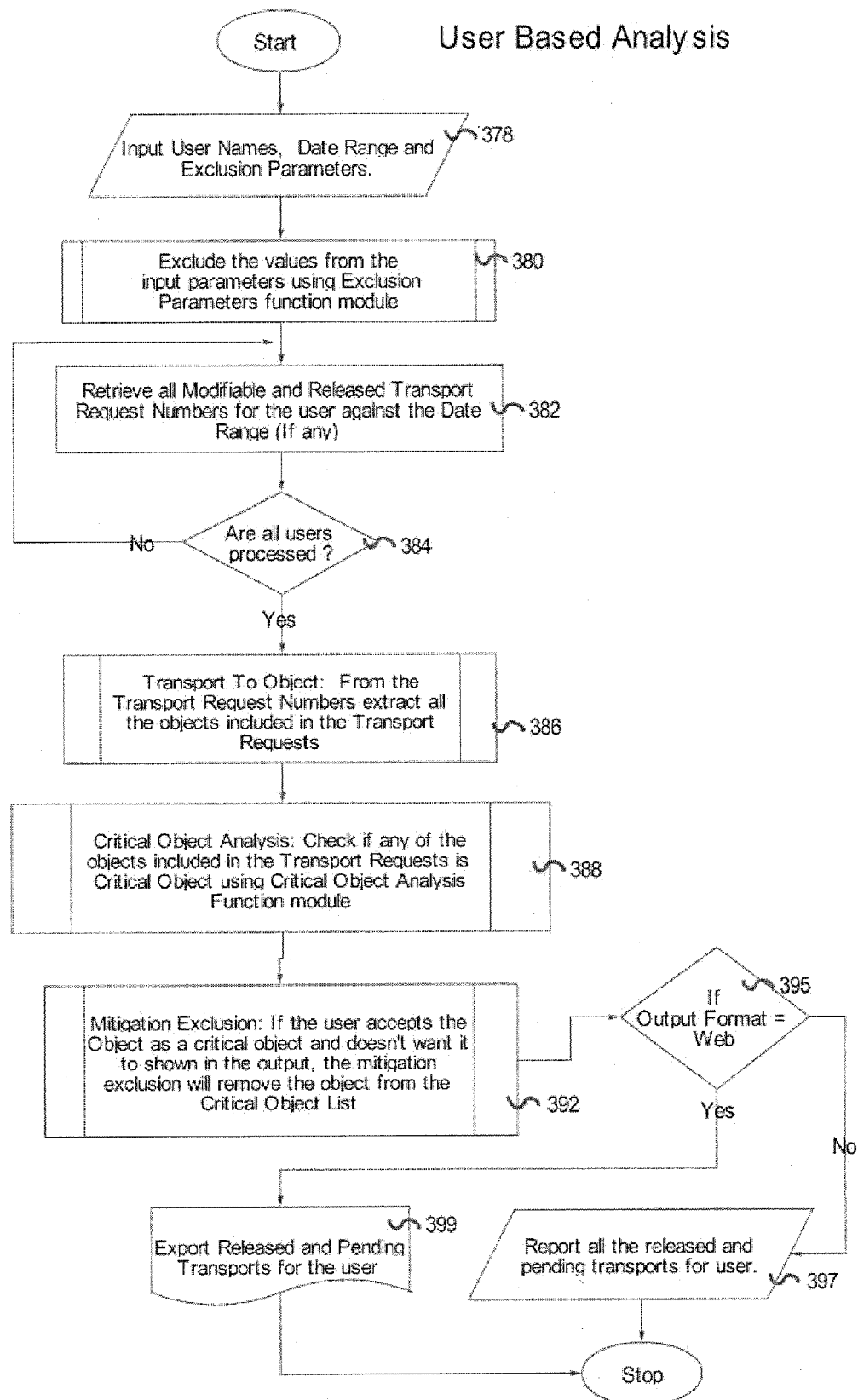
Fig: 18

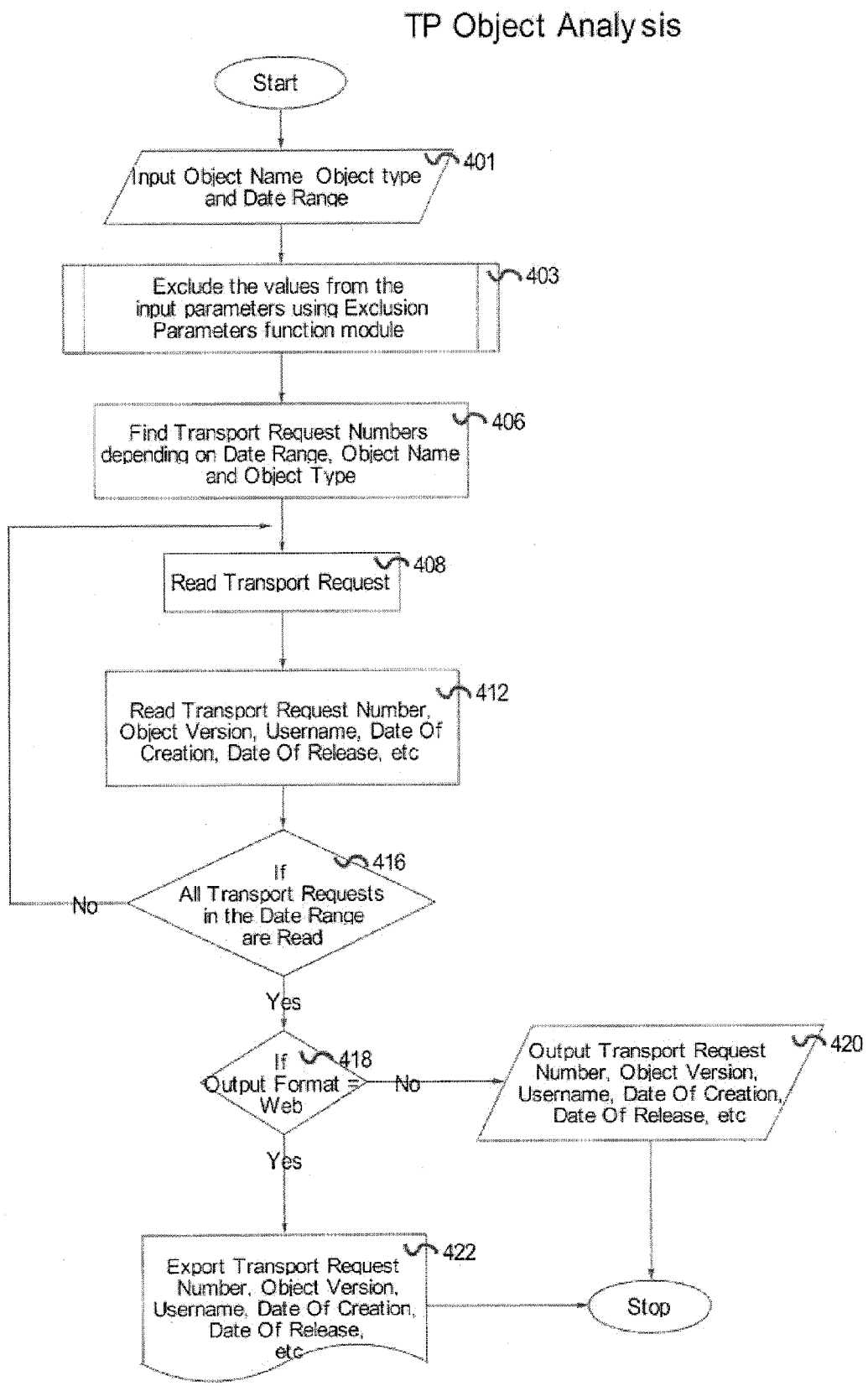
Fig: 19

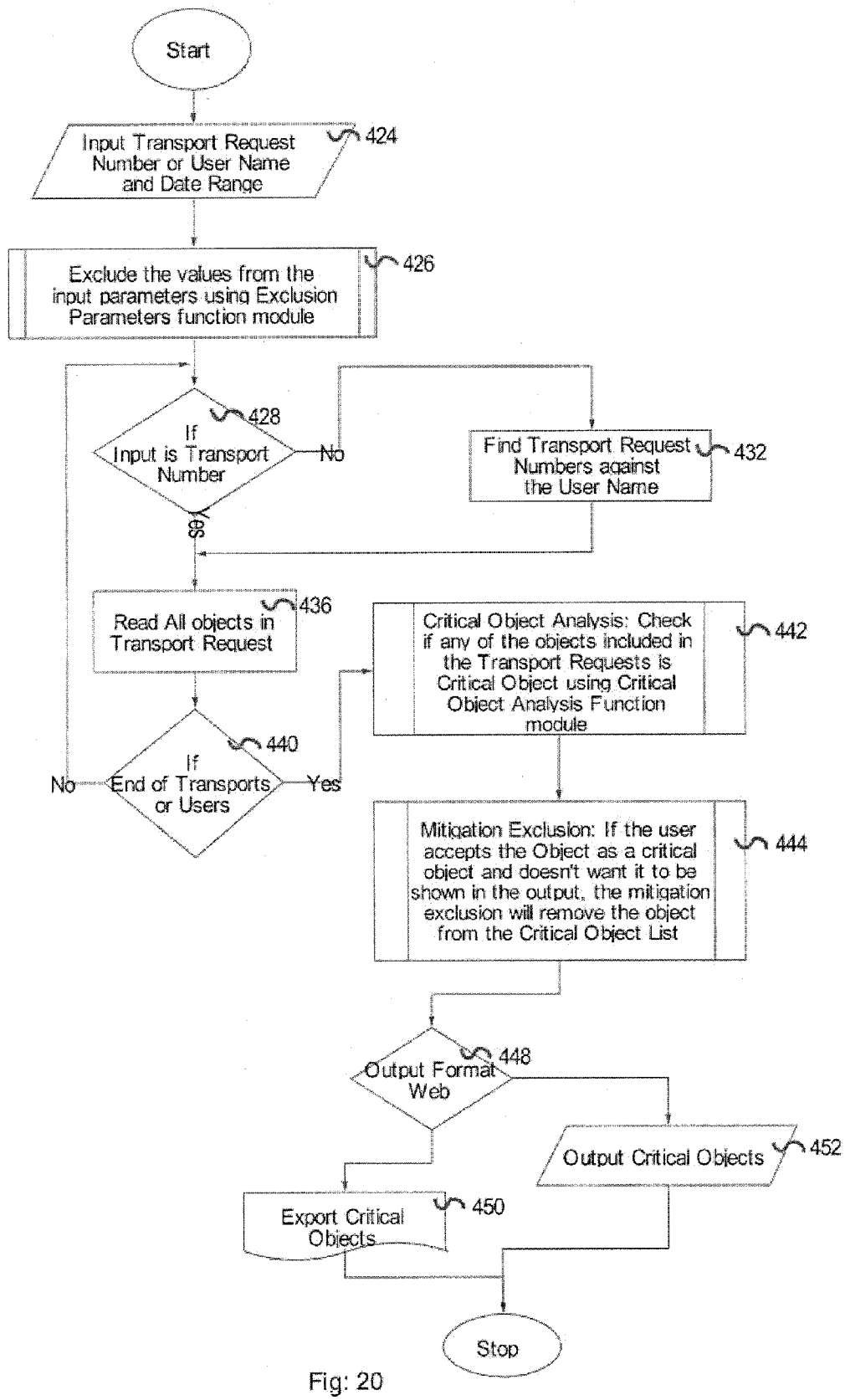
Fig: 20

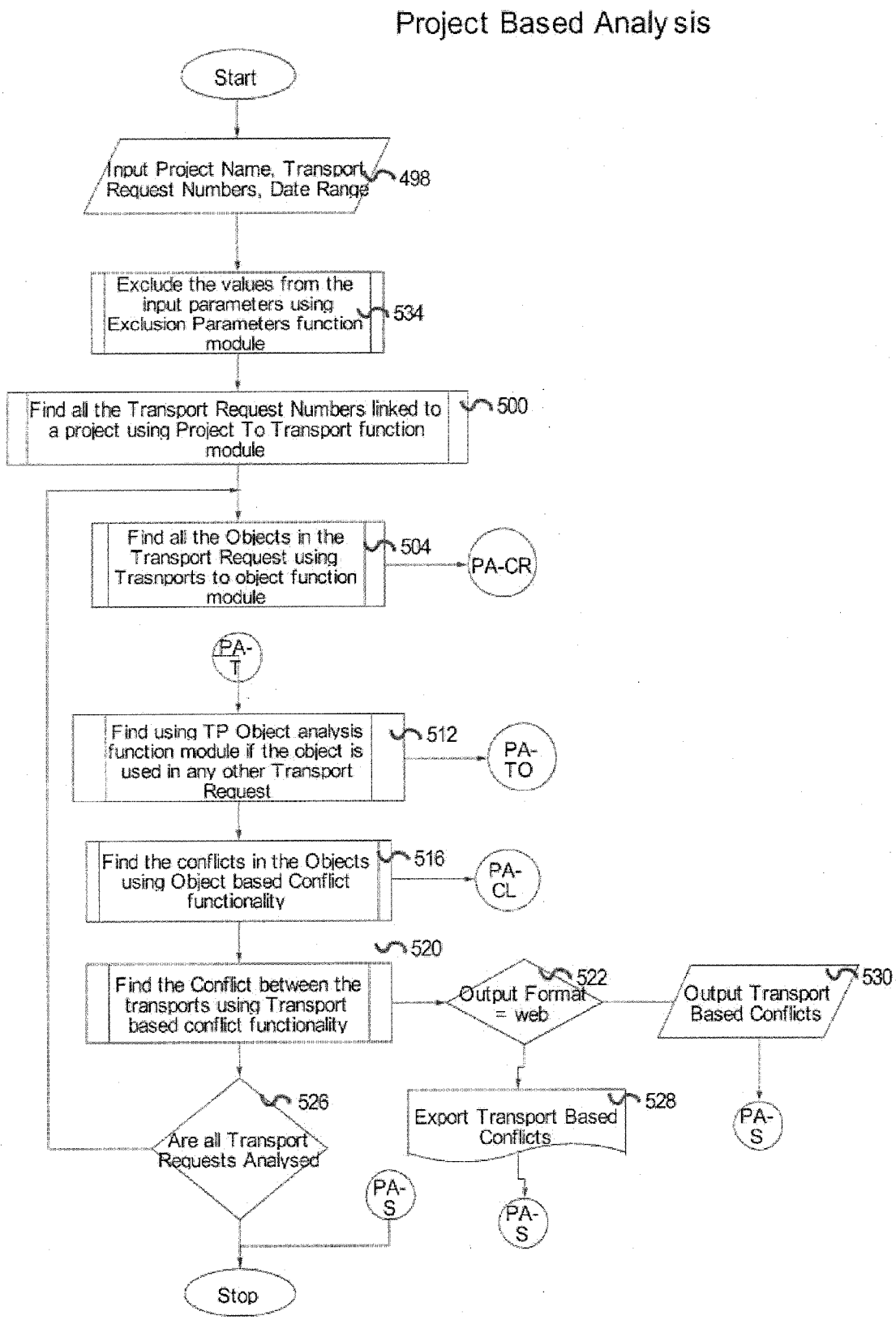
Fig: 22.1

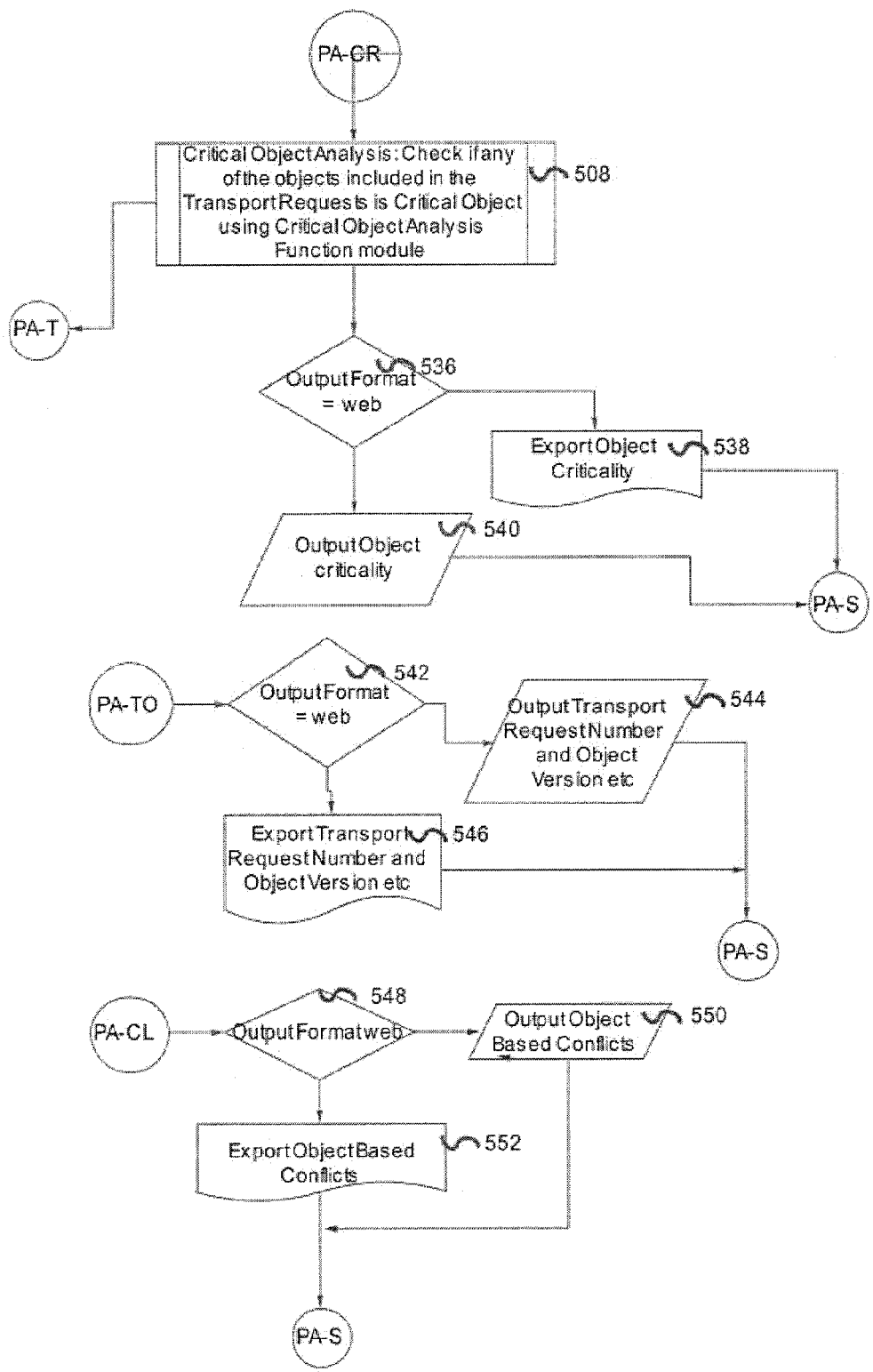
Fig: 22.2

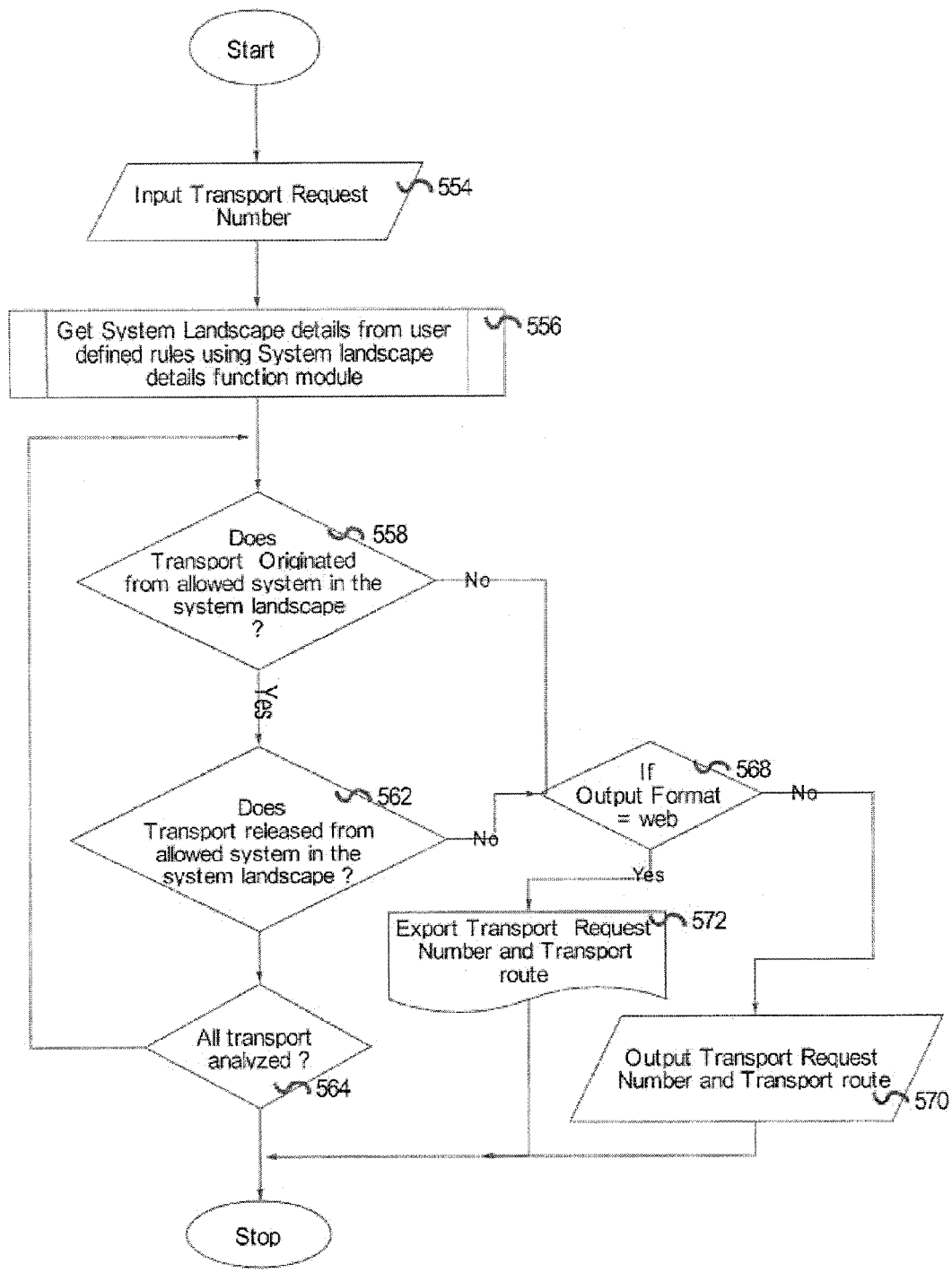
Fig: 23

SYSTEMS AND METHODS FOR RISK ANALYSIS AND UPDATING OF SOFTWARE

This application claims priority to U.S. application Ser. No. 11/966,088, filed Dec. 28, 2007, the content of which is incorporated by reference.

BACKGROUND

The present system relates to risk analysis of change objects in a data processing environment.

As businesses grow, one problem is that the amount of change that must be implemented in a given time frame continues to accelerate. Keeping up with the organization's rapidly changing business requirements is becoming increasingly difficult. During the 1990s, companies began to embrace the concept of enterprise resource planning (ERP) systems and to gravitate toward prewritten business applications such as those provided by SAP AG. SAP is a German acronym for "Systemanalyse und Programmentwicklung," which can be loosely translated into "Systems and Application Products."

The SAP system has become popular because SAP provides a complete solution to standard business requirements such as manufacturing, accounting, financial management, and human resources. It incorporates ERP concepts and business process reengineering (BPR) into an integrated solution for business applications.

As companies that use SAP grow, they need to modify the SAP system software. As application development projects grow larger, packages are becoming both increasingly important and cumbersome. For example, when changes are made to currently existing Advanced Business Application Programming™ (ABAP) software, the implication of such changes are difficult to foresee, which often causes problems in the future. Having an improved package can make the software's blueprint visible, which can make the changes to the software foreseeable and better protected against malicious changes. United States Patent 20060248507 discusses a method and system for object generation in packages. In one embodiment, the process for generating an object in a package is initiated. The package is created and is associated with a target package. The object is generated into the package.

SAP also provides a standard change transport management system (TMS), which is generally used by customers to manage the changes to SAP system. The native functionality provided by SAP TMS is not capable of performing real-time analysis for risk involved in the change or monitor the change for adherence to the organization policies and procedures. SAP TMS and its implementation tool Solution Manager do not have any configurable policy and procedure module and lack real-time analysis. In addition, neither TMS nor Solution Manager has capabilities to prevent the risky and unwanted changes creeping into the customer's system landscape. This makes the customers SAP system vulnerable to unwanted mistakes, intentional violations, frauds, misuse, and abuse, and is a major problem for IT compliance. The current process of after effect validation by manual processes is ineffective and does not resolve the issue of knowing in advance the after effects of a change in a real-time environment.

SUMMARY

In one aspect, systems and methods for updating software includes detecting a change for a change object being generated or mitigated across a system landscape; comparing the change to a predetermined guideline; and preventing the change from propagating across the system landscape.

In another aspect, a system to update software includes a processor; and a data storage device coupled to the processor, the data storage device comprising code to detect a change for a change object being generated or mitigated across a system landscape; compare the change to a predetermined guideline; and prevent the change from propagating across the system landscape.

Advantages of the preferred embodiment of the system may include one or more of the following. The system provides real-time risk analysis of all change objects in SAP in a composite multiple system environments, more appropriately composite framework of multiple change types at the same time. Companies using standard SAP installations of ERP (or ECC for latest versions) can install and implement this invention on their system landscape to utilize its capabilities of managing change requests (widely known as transports) and ensure ONLY qualified and appropriate transports are migrated to production environments. In addition, customers can use its preventive framework to block any unwanted transport from creeping into their landscape. The invention specifically provides built in capabilities to monitor the transports against customers policy and procedure framework and notify of any risk to the guidelines of the operating procedures. There are many ways by which this invention can ensure compliance to organizations policies and procedures for implementation of any change to system settings, programs, users, authorization and other change objects. For example, organizations can validate that only most latest version of a change object is applied to the system, hence eliminating risk of an obsolete and redundant change creeping into the system. The system allows real-time analysis for risk involved in the change. The system can also monitor the change for adherence to the organization policies and procedures. The system also provides a configurable policy and procedure module and real-time analysis of software changes and can prevent the risky and unwanted changes creeping into the customer's system landscape. This makes the customer's system immune to unwanted mistakes, intentional violations, frauds, misuse, and abuse. The after effect validation is done automatically and allows users to know in advance the after effects of a change in a real-time environment.

BRIEF DESCRIPTION OF THE DRAWINGS

FIG. 1 shows an exemplary process to perform real time management of change objects.

FIG. 2 shows an exemplary process that maps user request to transport request.

FIG. 3 shows an exemplary transport request to object mapping process.

FIG. 4 shows an exemplary object to object value mapping process.

FIG. 5 shows an exemplary process to provide details of an object version determination process.

FIG. 6 shows an exemplary process to compare object versions.

FIG. 7 shows an exemplary process to detail a list of transport requests that contain a particular object.

FIG. 8 shows an exemplary process to analyze critical objects.

FIGS. 9.1-9.2 show an exemplary process to determine object to object value conflicts.

FIG. 10 shows an exemplary process to retrieve active object versions.

FIG. 11 shows an exemplary process to remove process parameters.

FIG. 12 shows an exemplary process to determine system landscape route.

FIG. 13 shows an exemplary process to determine transport request numbers linked to a project.

FIG. 14 shows an exemplary process to determine transport route.

FIGS. 15.1-15.3 show an exemplary process to determine user based conflicts.

FIG. 16.1-16.2 show an exemplary process to determine transport based conflicts.

FIG. 17 shows an exemplary process to determine object based conflicts.

FIG. 18 shows an exemplary process to determine user based analysis.

FIG. 19 shows an exemplary process to analyze transport objects.

FIG. 20 shows an exemplary process to perform critical object analysis.

FIG. 22.1-22.2 show an exemplary process to perform project based analysis.

FIG. 23 shows an exemplary process to perform transport origin and release analysis.

DESCRIPTION

Figure 21:
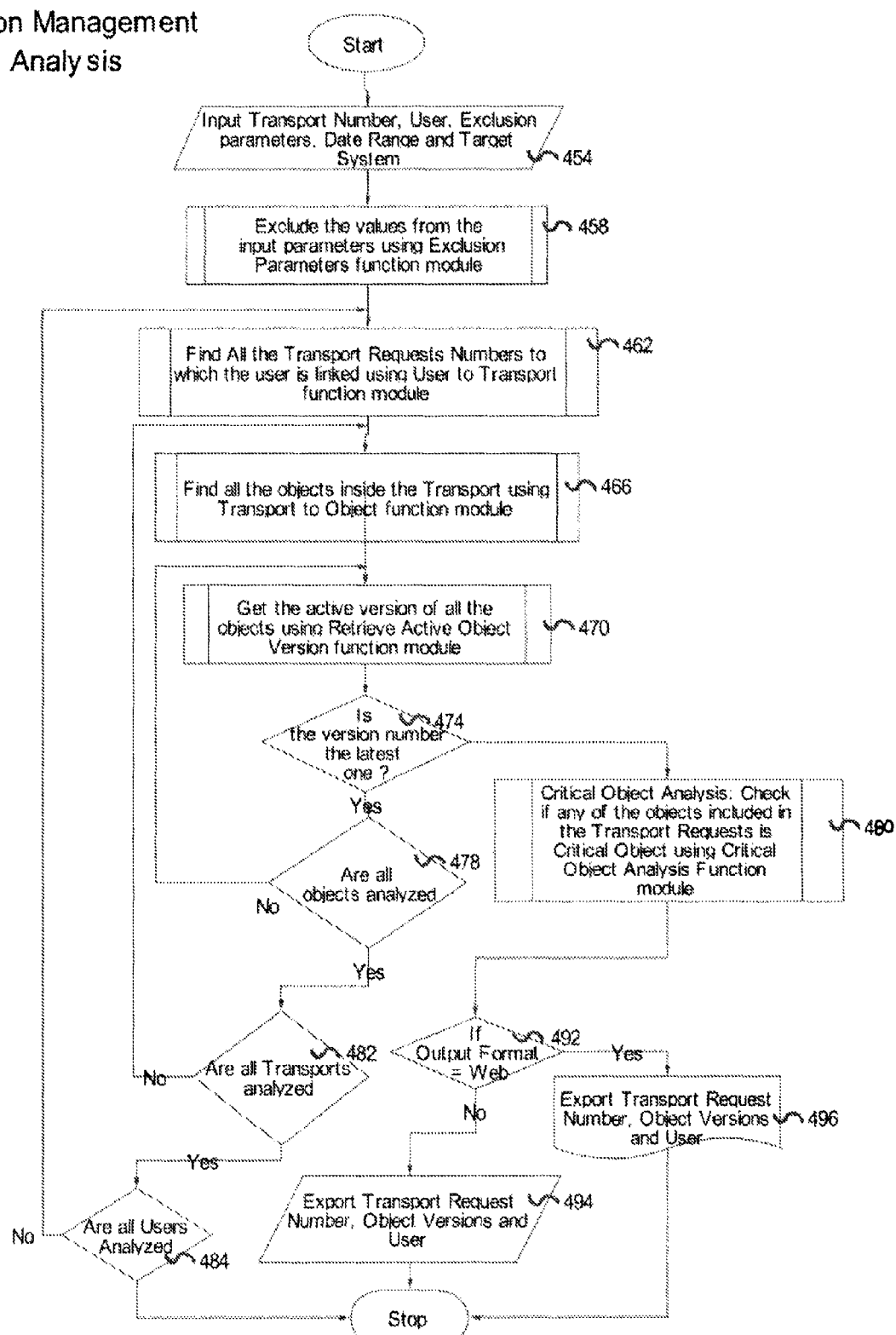
FIG. 21 shows an exemplary process to perform version management analysis.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), Digital Video Disk ROM (DVD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

FIG. 1 shows an exemplary process to perform real time management of change objects. The process first determines input change objects such as project, user, transport, object and/or date range (10). The process detects changes for change objects being generated or mitigated across the system landscape (20). The system then compares changes to one or more guidelines of best practices, policies, and procedures (30). The system determines whether a violation of the best practices, policies and procedures (40). If a violation is found, the process prevents changes from propagating across the system landscape (50) and reports a summary of potential problematic changes (60) before exiting. Alternatively, if no violation exists, the process exits and allows the change to be implemented.

The system of FIG. 1 provides real-time analysis of the change objects being generated or migrated across SAP system landscape and compares the changes to the guidelines of best practice policies and procedures followed by the customer. The invention involves a native computer program to work with SAP landscape. The program can be installed on the system or can be accessed through ASP model.

The system provides customers with the ability to categorize the changes and map the best practice procedures and rule sets to the categories. This enables risk linkage to the change category and monitoring of the change by appropriate authority.

The system can provide status information on change for analysis. The change under consideration can be analyzed against different status of changes e.g. released, modifiable, Modifiable protected, release started, released (with import protection for repaired objects). This composite status approach ensures that all type of changes applied to the system in a given period or yet to be applied are considered for risk analysis. The system also supports the change types defined in SAP as follows:

K Workbench Request
W Customizing Request
C Relocation of Objects Without Package Change
O Relocation of Objects with Package Change
E Relocation of Complete Package
T Transport of Copies
S Development/Correction
R Repair
X Unclassified Task
Q Customizing Task
G Piece List for CTS Project
M Client Transport Request
P Piece List for Upgrade
D Piece List for Support Package
F Piece List The risk analysis logic depends on the change type, which provides extensibility to the risk logic based on the change (change type) being applied to the system.

Another feature is controlling parameters. Currently, following controlling parameters are considered, which can be used in isolation or in a composite manner:
1. Date range
2. Status
3. Exclusions (defined by the customer as a safe list)
4. Mitigation (defined by customer as a counter measure to reduce or mitigate risk)

The system allows the analysis by broad spectrum of Change Class selection options for change risk analysis. These include:
1. Transport Request Number—Individual and Multiple
2. Change Object—Individual and Multiple
3. User—Individual and Multiple
4. Project—Individual The system provides a Risk Analysis type, which can be assigned to the selection options and the controlling parameters defined above. The following exemplary Risk Analysis types are available:
1. Critical Object Analysis
2. Version Management
3. Object Conflict Analysis
4. Rule based (Object value) Risk Analysis The composite framework is created as:

Change Class+Risk Analysis Types+Controlling Parameters→Coupled with Change status and Change type.

The system allows customers to pick any selection option depending upon their IT control matrix and perform analysis in real time. In addition, analysis for system of origin and change route can also be performed as out of box functionality. The output of the analysis provides separate set of reports depending upon the composite matrix selected above. The output matrix may have transport number, creation date, creation time, created by, system of origin, underlying change object, change object value, conflict type, risk level, critical object and other parameters as defined by the customers. All these parameters are provided out of box and can be customized on screen by user without any programming or code change.

FIG. 2 shows an exemplary process that maps user request to transport request. The process takes user name, transport type, transport status and date range as exemplary input (101). The process determines the transport request number for the user and the date range, depending on the transport request status and transport request type (104). The transport request numbers are returned as the output (106). The User To Transport process determines transports for the user. This function module provides the transport requests created, modified, assigned, etc. to the user. It takes user name as the input parameter and provides information on transport requests, like modifiable, released, among others.

FIG. 3 shows an exemplary transport request to object mapping process. The Transport to Objects process determines change objects in a transport. The process provides objects included in a transport request, it takes the transport number as the input parameter and returns all objects included in the transport request. The process takes the transport request number and data range as the input data (110). The process locates all objected included in the transport request number (114) and returns all objected included in the transport request as the output (116).

FIG. 4 shows an exemplary object to object value mapping process which determines and compares change object values. In a transport request some objects carry values with them, the process in this function module returns the value of the object in the transport request. The process uses as input the object name, object type, and transport request number (120). The process finds the values of objects in the particular transport request number (124). The process then determines whether the object value in the particular transport is found (128). If not, the process exits, and alternatively, the process returns the value of the object as its output (130).

FIG. 5 shows an exemplary process to provide details of an object version determination process. The process determines changed object version values. As an object can exist in different versions in the system (there can be only one active version) and different transport requests can have different version of the same object, the system needs to find the version of the object in the particular transport. This function module provides the version of the object included in the particular transport. The process receives as inputs the object name, object type, and transport request number (132). Next, it locates the particular version of the object in the transport request number (135) and returns the object version details as the output (138).

FIG. 6 shows an exemplary process to compare object versions. The process receives as inputs the object name, object type, and transport request number (141). The process finds object versions using the object to object version process of FIG. 5 with different transport request numbers (143). The process compares the versions of the object in the different transport requests (146). Next, the process determines whether the object version in a first transport equals the object version in the second transport (148). If yes, a comparison result flag is set to true (151). Alternatively, if the versions differ, the comparison result flag is set to false (154). The process outputs the transport request numbers, the object name, object version, and the comparison result flag (157).

FIG. 7 shows an exemplary process to detail a list of transport requests that contain a particular object. An object could be included in more than one transport requests, this function module finds the transport request numbers where a particular object is included. Based on the object name and transport type as the input, the process looks for the object in the particular transport request types. In this process, the process receives as inputs the object name, object type, transport request type, transport request status and date range (160). The process locates transport request numbers which include the object (163). The process then lists the transport request numbers (166).

FIG. 8 shows an exemplary process to analyze critical objects. The process receives as inputs the object name, object type, and date (170). Critical objects are retrieved from the Critical Objects Repository (173). Critical objects are high-risk objects, which could have severe business or compliance impact, hence require special monitoring. An example is a configurable object, which determines the access authorization to database tables and sensitive information like employee data. Any change to such an object is not a normal business change and must be approved/authorized as per organization policies and procedures. The program highlights changes to such object even though it does not find any conflict with other objects being transported or with the version of the object.

The process checks if the object name matches an entry in the Critical Objects Repository (176). If the object exists in the Repository (178), the process lists the object as a Critical Object (180). Alternatively, if there is no match in the Repository, the process leaves critical object field as blank to indicate that the object is non-critical (182).

FIGS. 9.1-9.2 show an exemplary process to determine object to object value conflicts. This functionality will find if the objects in two different transport requests have the same values or not. If the values of same object are different in two transport request numbers then it is a conflict and is reported. The process receives as inputs two transport request numbers (186). The process accesses the object of the first transport request number (188). The process determines if the object in the first transport request number has a value (190). If so, the process locates the object in the second transport request number (194). The process then determines if the object of the first transport request number is found in the second transport request number (196). If not, the process loops back to 190. Alternatively, if the object is in both request numbers, the process finds the value of the object in the first and second transport requests (200). From 200, the process determines whether the value of the object in the first transport request number differs from the value of the object in the second transport request number (202). If so, the process flags the object value conflict (208). If there is no conflict, the process selects the next object for processing. The process then checks to see if all objects have been processed (206) and if not, loops back to 190 to continue processing the objects.

FIG. 10 shows an exemplary process to retrieve active object versions. This is a cross system functionality which will get the object version from the remote/target system. The object name and target system is used to pick active object version from the residing system and send it to the calling system. The process receives as inputs the object name and the target system (211). The process then locates the active object version of the object in the local system using the object to Object Version process of FIG. 5 (215). The process exports the matching active object version to the target system (220) and exits.

FIG. 11 shows an exemplary process to remove predetermined process parameters (exclusion parameters). There can be some parameters which user might like to skip when running different functionality, like removing some user[s] from the range of users when running an analysis. The process takes as input the process/exclusion parameters, and removes the exclusion parameters from the process parameters. The process receives as inputs the process parameters such as object name and transport request number and/or users (224). The process reads the process parameters (228) and compares the process parameters against the exclusion parameter (230). If the process parameters match the exclusion parameters (234), the process removes the object with the process parameter (238) and exits.

FIG. 12 shows an exemplary process to determine system landscape route to which a transport request belongs. The process receives as input the transport request number (241). The process then gets the transport origin and release system (system identification) (242). The process also gets the customer defined transport route from the Repository database (246). The process then gets the system landscape for the system identification (248). The process checks whether the landscape route is found in the Repository database (251). If not, the system is not defined in the transport route (254) and the process exits. Alternatively, if the landscape route is found, the process outputs the landscape route (258) and exits.

FIG. 13 shows an exemplary process to determine transport request numbers linked to a project. This functionality finds the transport request numbers maintained for a project. The process receives as inputs the project name and date range (261). The process searches for the project name in the transport request description (264). The process then obtains the transport request number of the project (267). The process generates the transport request numbers that are linked to the project (269).

FIG. 14 shows an exemplary process to determine transport route to see if the transport has been imported into a system. The process receives as inputs the transport request number and the target system identification (271). The process then checks whether the transport request number exists in the system or has the transport request number been imported into the system (274). If no, the process indicates that the transport request number does not exist in the system (276). Alternatively, the process indicates that the transport request number exists in the system (278) and exports the results therefrom (280) and exits.

FIGS. 15.1-15.3 show an exemplary process to determine user based conflicts. In user based conflict, different user data is analyzed:

1. The transports open for any user can be compared and reported for any duplicity.
2. Multiple users can also be compared to find if there are any conflicting activities among the users.
3. User open transports can be compared with versions of already released transports and determined if any old or questionable transport is open.
4. Critical object analysis can be done for the user.

The process receives as inputs the user name, date range and exclusion parameters (282). Next, the values from the input parameters are excluded using the Exclusion Parameter process of FIG. 11 (284). Open transport requests for the user within the date range are read (288), and objects included in the transports are also retrieved (290). Next, the process analyzes critical objects to see if any objects included in the transport request are critical objects (293). This is done using the critical object analysis of FIG. 8. The process then performs mitigation exclusion (296). If the user accepts the object as a critical object and does not wish to show in the output, the mitigation exclusion operation removes the object from the critical object list. The process then determines whether the output is to be formatted for the Web (299). If not, the critical objects are reported (302). Alternatively, the critical objects are exported in a Web format (304) and the process exits.

From 290, the process can compare the transport requests and their objects with other transports that are open for the user (299). The process then determines if any object(s) exists in more than one transport (306) and if so, performs mitigation exclusion (316). Next the process determines the output format (318). If the format is Web format, the conflict information is exported (322), and if a report is to be generated, the conflict information is generated as a report (320).

From 299, the process then checks if the version of the objects in the transport is the latest version (309). If the version is current, the process skips the current transport from further processing by marking the current transport request as already processed (314). Next, the process checks to see if all users have been analyzed. If not, the process loops back to 288, and alternatively, if all users have been analyzed, the process exits.

Alternatively, from 309, if the version of the object is not current, the process checks if the output is to be in a Web format (326). If not, the process reports the object version and the transport (328), and if web reporting is to be done, the process exports the object version and transport to generate a Web report (330) and exits.

FIGS. 16.1-16.2 show an exemplary process to determine transport based conflicts. The open transports are compared and any conflict reported. The conflicts are reported at object level and further at the field value level. First, the process receives as inputs the transport request numbers and the date range (330). Next, values from input parameters are excluded using the parameter exclusion operation of FIG. 11 (332). The process locates open transports based on the input parameters (334). The process then reads the transport requests (337) and all objects included in the transport request number (340). The process checks to see if all transport requests have been processed (343). If not, the process loops back to 337 to handle the next transport request. Alternatively, if the transport requests have been completed handled, the process compares the objects of the transports to determine potential conflicts among the transports (346) and checks for conflicts (348). If there is no conflict, the process exits. Alternatively, the process performs mitigation exclusion (350). If the user accepts the object as a critical object and does not wish to show in the output, the mitigation exclusion operation removes the object from the critical object list. The process then determines whether the output is to be formatted for the Web (353). If not, the conflicts are displayed (355). Alternatively, the conflicts are exported in a Web format (357) and the process exits.

FIG. 17 shows an exemplary process to determine object based conflicts. Users can provide object and the program would provide information if this object has a conflict with any other open objects for release. If the object is critical, the report would show it additionally. First, the process receives as inputs the object names, object types, the date range and exclusion parameters (360). Next, values from input parameters are excluded using the parameter exclusion operation of FIG. 11 (362). A critical object analysis is also done to determine if the object is a critical object (364). The process locates open transports based on the input parameters (366). The process checks if the number of transports for a given object is greater than one (368) and if so, the process performs mitigation exclusion (370). If the user accepts the object as a critical object and does not wish to show in the output, the mitigation exclusion operation removes the object from the critical object list. The process then determines whether the output is to be formatted for the Web (372). If not, the conflicts are displayed (374). Alternatively, the conflicts are exported in a Web format (376) and the process exits.

FIG. 18 shows an exemplary process to determine user based analysis. The process would use one layer or multiple users and show all the transports pending and released as well as any critical objects involved in any transport. The process receives as inputs the user name, exclusion parameters and the date range (378). Next, values from input parameters are excluded using the parameter exclusion operation of FIG. 11 (380). Next, the process retrieves all modifiable and released transport request numbers for the user against the date range (382). The process checks that all users are processed (384) and loops back to 382 if not. Once all users have been processed, the process extracts all objects included in the transport requests (386). Next, a critical object analysis is performed (388) and then mitigation exclusion is done (392). If the user accepts the object as a critical object and does not wish to show in the output, the mitigation exclusion operation removes the object from the critical object list. The process then determines whether the output is to be formatted for the Web (395). If not, the conflicts are displayed (397). Alternatively, the released and pending transport information is exported in a Web format (399) and the process exits.

FIG. 19 shows an exemplary process to analyze transport objects. In this case, user can put one or more objects and perform analysis. The output would show, how many transports already released with this transport with Transport number, version, user name, date, for example, and would also show transport requests pending for these objects. The process receives as inputs the object name/type and the date range (401). Next, values from input parameters are excluded using the parameter exclusion operation of FIG. 11 (403). The process then locates transport request numbers based on the date range, object name and type (406). Next, for each transport request, the process reads the transport request (408) and reads the transport request number, the object version, the user name, the date of creation, the date of release, among others (412). The process repeats for all transport requests within the date range (416). Next, the process then determines whether the output is to be formatted for the Web (418). If not, the output transport request number, object version, user name, date of creation/release information is output (420). Alternatively, the information is exported in a Web format (422) and the process exits.

FIG. 20 shows an exemplary process to perform critical object analysis. This would be done using the critical object table, where any transport or user information would be provided if the object is touching any critical object setup in the table. The process receives as inputs the user name, transport request number and the date range (424). Next, values from input parameters are excluded using the parameter exclusion operation of FIG. 11 (426). The process checks if the input is a transport number (428) and if not the process locates all transport request numbers against the user name (432). Alternatively, if the input is a transport number, the process reads all objects in the transport request (436) and checks for end of transports or users (440). Next, a critical object analysis is done to see if the object is a critical object (442) and then mitigation exclusion is done (444). If the user accepts the object as a critical object and does not wish to show in the output, the mitigation exclusion operation removes the object from the critical object list. The process then determines whether the output is to be formatted for the Web (448). If not, the critical objects are displayed (452). Alternatively, the critical object information is exported in a Web format (450) and the process exits.

FIG. 21 shows an exemplary process to perform version management analysis. The analysis would check the objects in transport and find the functional modules where these objects have been used. It would fetch the version/date data of those transports earlier applied to the code and ensure the transport being analyzed is the latest transport and not an outdated version, which could over write the later designed functionality. The process can show as output details of the transport being analyzed and already released with details of version, objects, date, user, among others. The process receives as inputs the user name, transport request number, exclusion parameters, and the date range (454). Next, values from input parameters are excluded using the parameter exclusion operation of FIG. 11 (458). The process finds all transport request numbers to which the user is linked using the User to Transport module (462). Next, the process finds all objects inside the transport using the transport to objection module (466). The process also gets the active version of all objects using the retrieve active object version module (470). The process then checks if the version number is the latest version number (474). If not, the process performs critical object analysis to see if an object included in the transport request I critical using the critical object analysis module (480). The process then determines whether the output is to be formatted for the Web (492). If so, the information is output (496). Alternatively, the information is exported in a Web format (494) and the process exits.

From 474, if the object is the latest version, the process checks to see if all objects have been analyzed (478). If not, the process loops back to 470 to continue processing, and alternatively, if all objects have been analyzed, the process checks if all transports have been analyzed (482). If not, the process loops to 466 to process the next transport. Once all transports have been processed, the process checks if all users have been analyzed (484). If not, the process loops to 462 to process the next users, and alternatively, if all users have been analyzed, the process exits.

FIGS. 22.1-22.2 show an exemplary process to perform project based analysis of the transports and objects at the project level. It will take project name or transport numbers as input and provides the following analysis:
1. Critical Object Analysis
2. TP Object Analysis
3. Object Based Conflict
4. Transport Based Conflict The process receives as input the project name, transport request numbers, and date range (498). Next, values from the input parameters are excluded using the Exclusion parameter operation of FIG. 11 (534). The process then locates all transport request numbers linked to the project using the project to transport function module of FIG. 13 (500). Next, for all transport requests, the following operations are done. The process locates all objects in the transport request using the transport to objection function module (504) and determines if there are any critical objects in the transport request (508). If the user accepts the object as a critical object and does not wish to show in the output, the mitigation exclusion operation removes the object from the critical object list. The process then determines whether the output is to be formatted for the Web (536). If not, the critical objects are output (540). Alternatively, the critical object information is exported in a Web format (538) and the process exits.

From 508, the process determines if the object is used in any other transport request using the transport object analysis function module (512). The process then determines whether the output is to be formatted for the Web (542). If not, the transport request number and object version and other information are output (544). Alternatively, the information is exported in a Web format (546) and the process exits.

From 512, the process checks for conflicts in the objects using the object based conflict function module (516). The process then determines whether the output is to be formatted for the Web (548). If not, the object conflict information is output (550). Alternatively, the object conflict information is exported in a Web format (552) and the process exits.

From 516, the process determines conflicts between transports using Transport based conflict module (520). The process then determines whether the output is to be formatted for the Web (522). If not, the transport conflict information is output (530). Alternatively, the transport conflict information is exported in a Web format (528) and the process exits.

From 520, the process checks whether all transport requests have been analyzed (526). If not, the process locates the next transport request and loops back to 504 to continue processing the transport requests in the project. Alternatively, if all transport requests have been analyzed, the process exits.

FIG. 23 shows an exemplary process to perform transport origin and release analysis. This Analysis will check if the transport has originated and released from the systems already defined as the landscape route defined by the customer based on their best practices. The process takes transport number as the input and checks the system of origin and system of release before giving the results. The process receives as input the transport request number (554). Next, the process retrieves the system landscape details from user-defined rules using the system landscape detail function module (556). The process then checks if the transport originated from an allowed system in the system landscape (558). If so, the process checks whether the transport is released from an allowed system in the system landscape (562). The process then determines whether all transport requests have been analyzed (564) and if not, the process loops back to 558 to process the next transport request. From 558 or 562, the process then determines whether the output is to be formatted for the Web (568). If not, the transport request number and transport route information is output (570). Alternatively, the same information is exported in a Web format (572) and the process exits.

Figure 24:
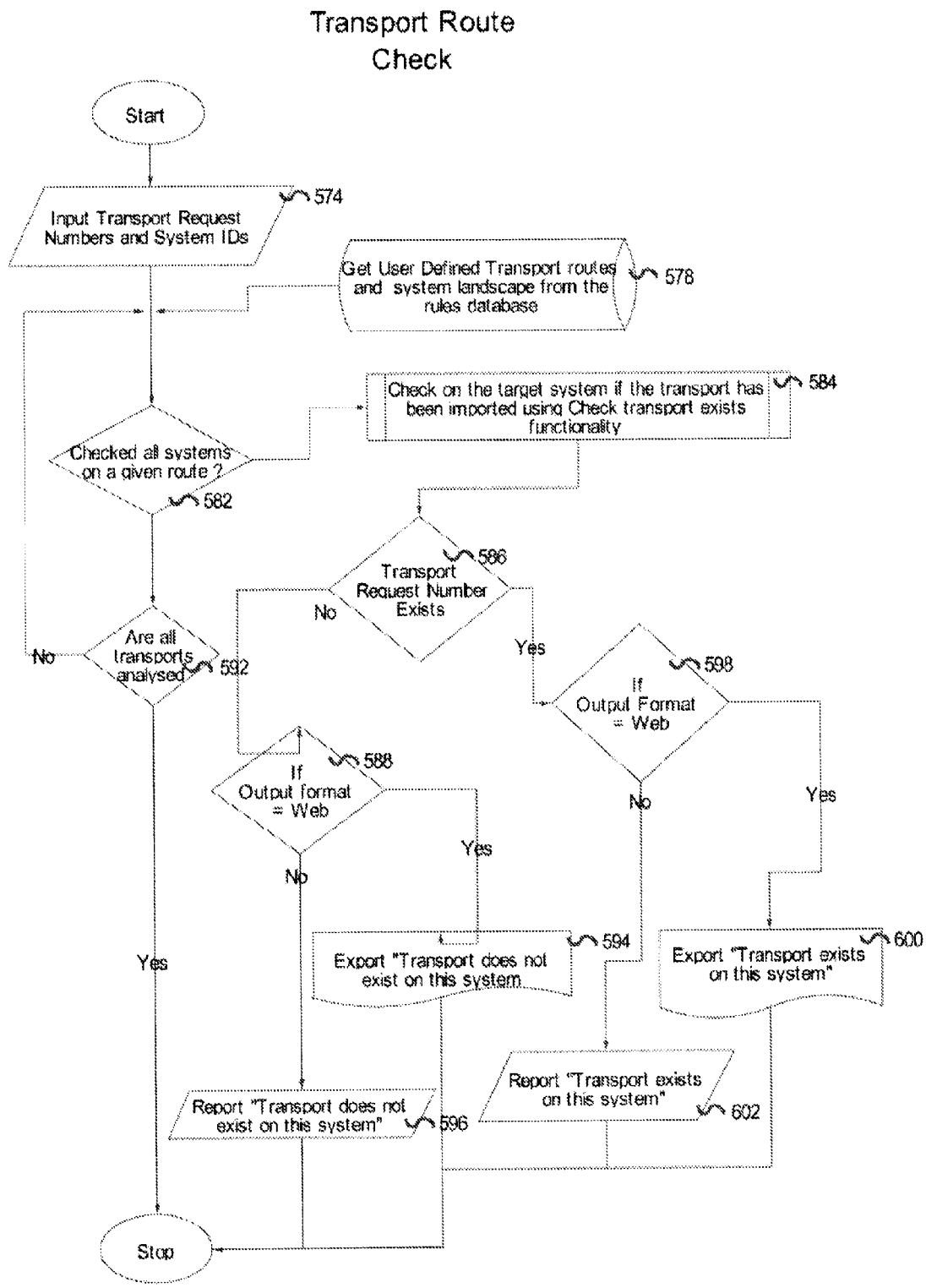
FIG. 24 shows an exemplary process to perform transport route checking.

FIG. 24 shows an exemplary process to perform transport route checking. The process checks whether the transport has followed the route defined by the customer based on their best practices, and additionally, the process analyzes the flow of transport across the systems. The process receives as input the transport request numbers and the system identifications (574). The process also receives the user defined transport routes and system landscape from the rules database (578). Next, for each transport and each system, the process analyzes the transport route as follows. The process determines whether all systems in a given route have been checked (582). If not, the process checks on the target system if the transport has been imported using the check transport exists module (584). Next, the process checks if the transport request number exists in the system (586). If not, the process then determines whether the output is to be formatted for the Web (588) and exports information on the non-existence of the transport request number (594) ors output the non-existence information (596), depending on the selected output mode. Alternatively, if the transport request number exists, the process then determines whether the output is to be formatted for the Web (598) and exports information on the existence of the transport request number (600) ors output the existence information (602), depending on the selected output mode. From 582, if all systems for a given route have been checked, the process further checks to see if all transports have been analyzed (592) and if not, loops back to 582 to continue processing. If all transports have been analyzed, the process exits.

Figure 25:
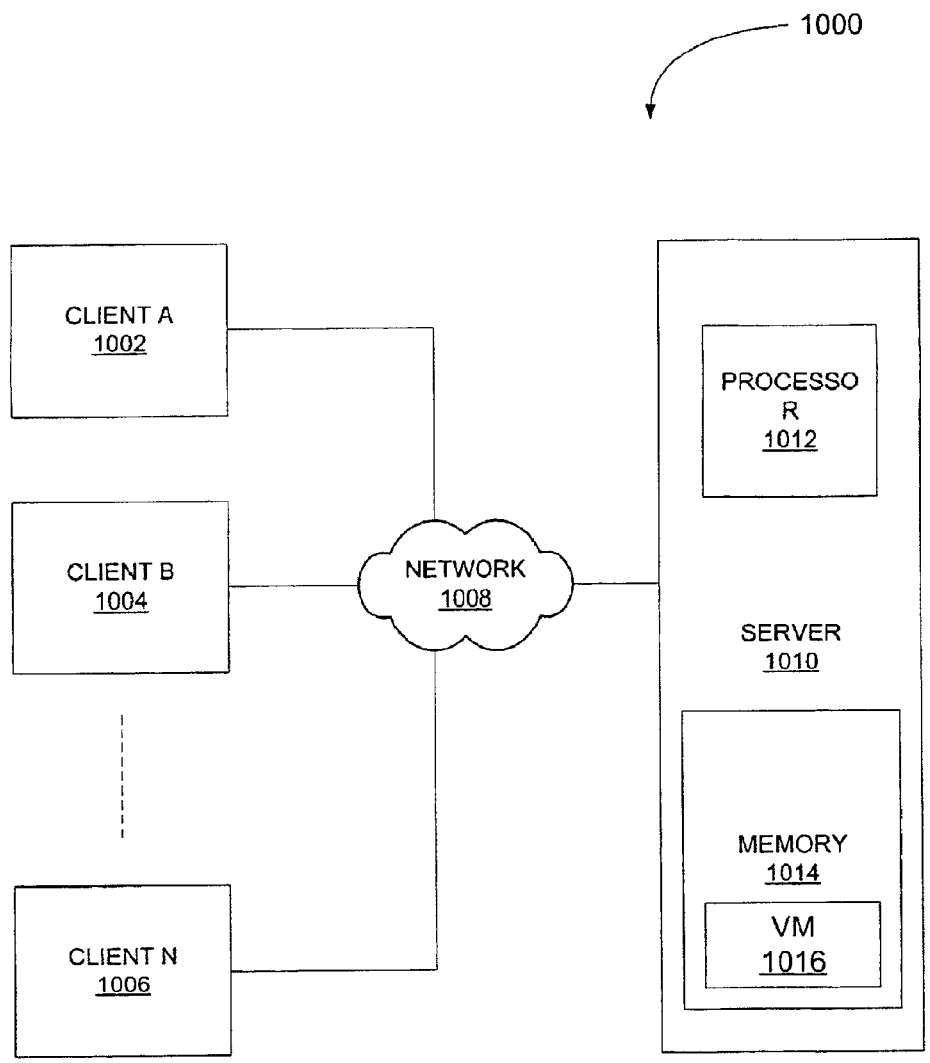
FIG. 25 illustrates an exemplary client/server system used in implementing one or more embodiments of the invention

FIG. 25 illustrates an exemplary client/server system 1000 used in implementing one or more embodiments of the invention. In the illustrated embodiment, a network 1008 links a server 1010 with various client systems A-N 1002-1006. The server 1010 is a programmable data processing system suitable for implementing apparatus, programs, or methods in accordance with the description. The server 1010 provides a core operating environment for one or more runtime systems that process user requests. The server 1010 includes a processor 1012 and a memory 1014. The memory 1014 can be used to store an operating system a Transmission Control Protocol/Internet Protocol (TCP/IP) stack for communicating over the network 1008, and machine-executable instructions executed by the processor 1012. In some implementations, the server 1010 can include multiple processors, each of which can be used to execute machine-executable instructions.

The memory 1014 can include a shared memory area that is accessible by multiple operating system processes executing at the server 1010. An example of a suitable server to be implemented using the client/server system 1000 may include J2EE compatible servers, such as the Web Application Server developed by SAP AG of Walldorf, Germany, or the WebSphere Application Server developed by International Business Machines Corp. (IBM.RTM.) of Armonk, N.Y.

Client systems 1002-1006 are used to execute multiple applications or application interfaces. Each instance of an application or an application interface can constitute a user session. Each user session can generate one or more requests to be processed by the server 1010. The requests may include instructions or code to be executed on a runtime system (e.g., the virtual machine (VM) 1016) on the server 1010. A VM 1016 is an abstract machine that can include an instruction set, a set of registers, a stack, a heap, and a method area, like a real machine or processor. A VM 1016 essentially acts as an interface between program code and the actual processor or hardware platform on which the program code is to be executed. The program code includes instructions from the VM instruction set that manipulates the resources of the VM 1016.

Figure 26:
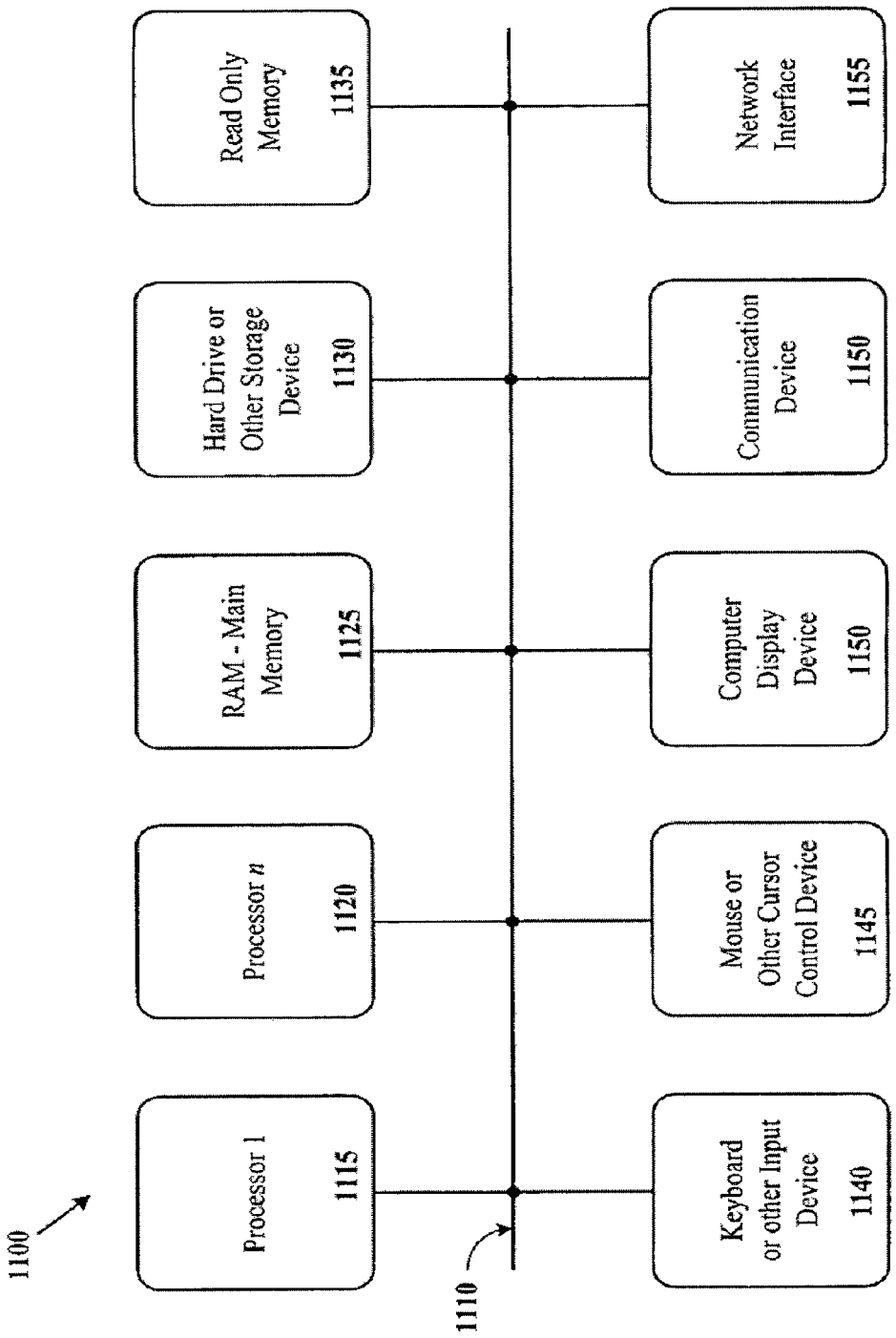
FIG. 26 shows an exemplary computer system used in implementing one or more embodiments of the invention.

FIG. 26 is an exemplary computer system 1100 used in implementing an embodiment of the present invention. In this illustration, a system 1100 comprises a bus 1110 or other means for communicating data. The system 1100 includes one or more processors, illustrated as shown as processor 1 1115 through processor n 1120 to process information. The system 1100 further comprises a random access memory (RAM) or other dynamic storage as a main memory 1125 to store information and instructions to be executed by the processor 1115 through 1120. The RAM or other main memory 1125 also may be used for storing temporary variables or other intermediate information during execution of instructions by the processors 1115 through 1120.

A hard drive or other storage device 1130 may be used by the system 1100 for storing information and instructions. The storage device 1130 may include a magnetic disk or optical disc and its corresponding drive, flash memory or other non-volatile memory, or other memory device. Such elements may be combined together or may be separate components. The system 1100 may include a read only memory (ROM) 1135 or other static storage device for storing static information and instructions for the processors 1115 through 1120.

A keyboard or other input device 1140 may be coupled to the bus 1110 for communicating information or command selections to the processors 1115 through 1120. The input device 1140 may include a keyboard, a keypad, a touch-screen and stylus, a voice-activated system, or other input device, or combinations of such devices. The computer may further include a mouse or other cursor control device 1145, which may be a mouse, a trackball, or cursor direction keys to communicate direction information and command selections to the processors and to control cursor movement on a display device. The system 1100 may include a computer display device 1150, such as a cathode ray tube (CRT), liquid crystal display (LCD), or other display technology, to display information to a user. In some environments, the display device may be a touch-screen that is also utilized as at least a part of an input device. In some environments, the computer display device 1150 may be or may include an auditory device, such as a speaker for providing auditory information.

A communication device 1150 may also be coupled to the bus 1110. The communication device 1150 may include a modem, a transceiver, a wireless modem, or other interface device. The system 1100 may be linked to a network or to other device using via an interface 1155, which may include links to the Internet, a local area network, or another environment. The system 1100 may comprise a server that connects to multiple devices. In one embodiment the system 1100 comprises a Java™ compatible server that is connected to user devices and to external resources.

While the machine-readable medium 1130 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1100 and that causes the machine to perform any one or more of the methodologies of the present invention. The term "machine-readable medium" shall accordingly be taken to include, but not be limited to, solid-state memories, optical and magnetic media, and carrier wave signals.

An article of manufacture may be used to store program code. An article of manufacture that stores program code may be embodied as, but is not limited to, one or more memories (e.g., one or more flash memories, random access memories (static, dynamic or other)), optical disks, CD-ROMS, DVD-ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Furthermore, it is appreciated that a lesser or more equipped computer system than the example described above may be desirable for certain implementations. Therefore, the configuration of system 1100 may vary from implementation to implementation depending upon numerous factors, such as price constraints, performance requirements, technological improvements, and/or other circumstances.

It is noted that processes taught by the discussion above can be practiced within various software environments such as, for example, object-oriented and non-object-oriented programming environments, Java based environments, such as a J2EE environment or environments defined by other releases of the Java standard), or other environments (e.g., a NET environment, a Windows/NT environment each provided by. Microsoft Corporation).

It should be noted that, while the embodiments described herein may be performed under the control of a programmed processor, such as processors 1115 through 1120, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method for updating enterprise resource planning (ERP) software, comprising:
   receiving a requested change for a object being generated or mitigated across a system landscape;
   comparing the requested change to a predetermined guideline to provide a real-time risk analysis of the object in a composite ERP framework of multiple change types at the same time; and
   preventing the requested change from propagating across the system landscape if the requested change violates the predetermined guideline based on the comparing;
   wherein the real-time risk analysis including:
      determining a system landscape route to transport the request change comprising:
         identifying transport origin and system identification,
         obtaining a customer defined transport route from a repository database,
         obtaining the system landscape for the system identification, and
         outputting the system landscape route if the system landscape route found in the repository database; and
      processing user based analysis comprising:
         receiving as inputs a name of a user, a date range, and exclusion parameters,
         excluding values from the input parameters according to the exclusion parameter,
         reading open transport requests for the user within the data range,
         determining if any objects included in the transport request are critical objects and output to web format; and
         performing mitigation exclusion based on the determination.

2. The method of claim 1, comprising reporting the requested change and the real-time risk analysis, wherein the real time risk analysis checks at least one of:
   an existence of a change request for same object waiting to move across multiple landscape, resulting in change collision;
   an out of sequence change request that does not follow a sequencing based on date of creation of change or approval of change;
   a real time detection of redundant program version;
   an existence of a critical object at application level; and
   one or more missing critical objects in a change request.

3. The method of claim 1, wherein the object is one of:
   a project, a user, a transport, or an object.

4. The method of claim 1, wherein the guideline comprises at least one of:
   best practices, policies, or procedures.

5. The method of claim 1, comprising mapping at least one of:
   a user request to a transport request,
   a transport request to an object, or
   an object to an object value.

6. The method of claim 1, comprising performing at least one of:
   determining an object version,
   comparing an object version,
   searching a transport request for a particular object,
   determining an object to object value conflict,
   retrieving an active object version,
   determining one or more critical objects,
   removing one or more process parameters.

7. The method of claim 1, comprising determining a transport request number linked to a project.

8. The method of claim 1, comprising determining transport route to see if a transport request has been imported into a system.

9. The method of claim 1, comprising determining user based conflicts, wherein user open transports are compared with versions of released transports, and determining if any old or questionable transport is open.

10. The method of claim 1, comprising determining transport based conflicts.

11. The method of claim 1, comprising determining object based conflicts.

12. The method of claim 1, comprising analyzing transport objects.

13. The method of claim 1, comprising performing version management analysis.

14. The method of claim 1, comprising performing project based analysis.

15. The method of claim 1, comprising performing transport origin and release analysis.

16. The method of claim 1, comprising performing transport route checking.

17. A system to update enterprise resource planning (ERP) software, comprising:
   a processor; and
   a data storage device coupled to the processor, the data storage device comprising:
      code to receive a requested change for a object being generated or mitigated across a system landscape in the ERP software;
      core to compare the requested change to a predetermined guideline to provide a real-time risk analysis of the object in a composite enterprise resource planning (ERP) framework of multiple change types at the same time; and
      code to prevent the requested change from propagating across the system landscape if the requested change violates the predetermined guideline based on the comparison;
      wherein provide the real-time risk analysis including:
         code to determine a system landscape route to transport the request change comprising:
            code for identifying transport origin and system identification, code for obtaining a customer defined transport route from a repository database, code for obtaining the system landscape for the system identification, and code for outputting the system landscape route if the system landscape route found in the repository database; and code to process user based analysis comprising:

code for receiving as inputs a name of a user, a date range, and exclusion parameters, code for excluding values from the input parameters according to the exclusion parameter, code for reading open transport requests for the user within the data range, code for determining if any objects included in the transport request are critical objects and output to web format; and code for performing mitigation exclusion based on the determination.

18. The system of claim 17, wherein the guideline comprises at least one of: best practices, policies, or procedures, further comprising:

code to determine a transport request number linked to a project and a transport route to see if a transport request has been imported into a system;

code to determine user based conflicts, wherein user open transports are compared with versions of released transports, and determining if any old or questionable transport is open; and code to determine transport based conflicts and object based conflicts.

* * * * *